(12) United States Patent
Paquette et al.

(10) Patent No.: US 10,642,868 B2
(45) Date of Patent: May 5, 2020

(54) DATA ANALYSIS AND VISUALIZATION

(71) Applicant: Tagb.io. Inc., San Francisco, CA (US)

(72) Inventors: Jesse Thomas Paquette, San Francisco, CA (US); Tom Covington, San Francisco, CA (US)

(73) Assignee: TAG.BIO, INC., San Francisco, CA (US)

( * ) Notice: Subject to any disclaimer, the term of this patent is extended or adjusted under 35 U.S.C. 154(b) by 510 days.

(21) Appl. No.: 14/830,702

(22) Filed: Aug. 19, 2015

(65) Prior Publication Data

US 2016/0055221 A1 Feb. 25, 2016

Related U.S. Application Data

(60) Provisional application No. 62/039,349, filed on Aug. 19, 2014.

(51) Int. Cl.
*G06F 16/00* (2019.01)
*G06F 16/28* (2019.01)

(52) U.S. Cl.
CPC .................... *G06F 16/287* (2019.01)

(58) Field of Classification Search
CPC ............................ G06F 17/5004; G06F 16/287
USPC .......................................... 707/722, 726, 805
See application file for complete search history.

(56) References Cited

U.S. PATENT DOCUMENTS

| | | | |
|---|---|---|---|
| 6,394,895 B1 | 5/2002 | Mino | |
| 8,229,715 B1 * | 7/2012 | Teller | G06F 17/50 434/72 |
| 8,818,788 B1 * | 8/2014 | Mihalik | G06F 17/2785 704/1 |
| 8,876,638 B2 | 11/2014 | Paul et al. | |
| 9,082,151 B2 * | 7/2015 | Snell | G06Q 40/025 |
| 9,454,726 B1 * | 9/2016 | Yao | G06N 5/022 |
| 10,078,689 B2 * | 9/2018 | Romano | G06F 16/287 |
| 10,467,261 B1 * | 11/2019 | Doyle | G06F 16/243 |
| 2004/0235565 A1 | 11/2004 | Shiozawa | |
| 2008/0103997 A1 | 5/2008 | Fein et al. | |
| 2008/0188353 A1 | 8/2008 | Vitolo et al. | |
| 2008/0312010 A1 | 12/2008 | Marty et al. | |
| 2009/0262137 A1 | 10/2009 | Walker et al. | |
| 2010/0035672 A1 | 2/2010 | Root | |
| 2010/0114739 A1 * | 5/2010 | Johnston | G06Q 30/06 705/26.1 |
| 2010/0298958 A1 | 11/2010 | Connelly | |
| 2011/0014974 A1 | 1/2011 | Torf | |
| 2011/0066506 A1 * | 3/2011 | Sung | G06Q 30/02 705/14.66 |
| 2011/0093418 A1 | 4/2011 | Kwok | |
| 2011/0143868 A1 | 6/2011 | Marty et al. | |

(Continued)

OTHER PUBLICATIONS

Paquette, J. et al. "Hypergraph visualization and enrichment statistics: how the EGAN paradigm facilitates organic discovery from Big Data." *Proc. of SPIE-IS&T Electronic Imaging*, SPIE. vol. 7865, 2011. Web. Jul. 21, 2016.

*Primary Examiner* — Hanh B Thai

(74) *Attorney, Agent, or Firm* — Mintz Levin; Michael Van Loy; Paul Brockland

(57) ABSTRACT

Design and implementation of complicated data analyses and creation of visualizations to present the results of such analyses can be performed using a data analysis application.

15 Claims, 47 Drawing Sheets

(56) References Cited

U.S. PATENT DOCUMENTS

| | | | |
|---|---|---|---|
| 2011/0276364 A1* | 11/2011 | Bergstrom | G06Q 10/04 705/7.29 |
| 2012/0214575 A1 | 8/2012 | Amaitis et al. | |
| 2013/0267328 A1 | 10/2013 | Heisler et al. | |
| 2013/0314241 A1* | 11/2013 | Jamison | E21B 44/00 340/853.1 |
| 2014/0018156 A1 | 1/2014 | Rizzotti et al. | |
| 2014/0089233 A1 | 3/2014 | Ellis et al. | |
| 2014/0173622 A1† | 6/2014 | Thompson | |
| 2014/0180451 A1 | 6/2014 | Marty | |
| 2014/0195334 A1* | 7/2014 | Emans | G06Q 30/0273 705/14.43 |
| 2014/0196062 A1* | 7/2014 | Emans | G06Q 30/0273 725/1 |
| 2014/0196081 A1* | 7/2014 | Emans | G06Q 30/0273 725/32 |
| 2014/0201063 A1* | 7/2014 | Snell | G06Q 40/025 705/38 |
| 2014/0310353 A1* | 10/2014 | Schneider | H04L 51/32 709/204 |
| 2015/0006440 A1† | 1/2015 | Nicholson et al. | |
| 2015/0065214 A1 | 3/2015 | Olson et al. | |
| 2015/0127652 A1* | 5/2015 | Romano | G06F 16/367 707/739 |
| 2015/0131845 A1 | 5/2015 | Forouhar et al. | |
| 2015/0148129 A1 | 5/2015 | Austerlade et al. | |
| 2015/0220252 A1† | 8/2015 | Mital et al. | |
| 2015/0370909 A1* | 12/2015 | Volach | G06O 30/0269 707/722 |
| 2016/0310850 A1 | 10/2016 | Covington et al. | |

\* cited by examiner
† cited by third party

BUILD CLASSIFIER

| Client application on user device | Cloud server 1100 |
|---|---|
| | After calculating variable significance for N vs. n, the server selects a subset of the most significant variables for creation of a classifier. |
| | The server performs cross-validation on a training set of entities with all classifier algorithms and returns a report. The server stores the trained classifier, assigning ownership to the user. |
| The user browses the cross-validation report and chooses to save the classifier. | |
| The application presents the MANAGE CLASSIFIERS interface, allowing the user to activate/inactivate the recently-created classifier as well as other user-owned classifiers, and share any of them in the fashion of PUBLISH REPORT. The user can also choose push options for notification of classified new entities: PUSH TO EMAIL (the user already is required to have an email address)<br>PUSH TO MOBILE (requires that the user have the mobile client application installed)<br>PUSH TO SMS (requires a phone number)<br>PUSH TO API (requires that the user specify a URL, an API public key, and have a server running at that url that responds to valid API pushes) | |
| ONGOING | |
| | The server records the criteria for qualifying a new entity in the background set N. |
| | 1) New data streams into the server via the API. The server determines if the new data about entity X qualify it for any of the active classifiers.<br>If X becomes qualified for any active classifier, the server runs the stored classifier algorithm, predicting assignment to set n on the new entity and pushes the result to the user. |
| | 2) New data streams into the server via the API. The server determines if the new data about previously-classified entity X qualify it for classifier evaluation. If X is previously-classified and the new data qualify it for classifier evaluation (i.e. n is now known), then the classifier is updated to reflect the accuracy of the prediction. |

NEW ANALYSIS AND SOCIAL SHARING, PT1

| Client | Application Server | Social Server | Analysis Server | Analysis Engine | Data server 2900 |
|---|---|---|---|---|---|
| User chooses new analysis | | | | | |
| | App server returns available datasets | | | | |
| User chooses dataset (MLB) | | | | | |
| Client presents MLB-specific UI | MLB-specific module provides cached information for starting MLB analyses (teams, players) | | | | |
| User builds an analysis protocol – picks a player and "pitch analysis" | | | | | |
| | MLB-specific module provides cached variables and metadata for MLB player pitch analysis | | | | |
| User uses client tools to slice pitch criteria for focus and background | | | | | |
| User chooses "run analysis" | | | | | |
| | App server calls analysis server with variables and slice criteria. Next... | | | | |

| Client | Application Server | Social Server | Analysis Server | Analysis Engine | Data server 3000 |
|---|---|---|---|---|---|
| | ...continued. | | Analysis server queries data server to define N, n | | Data server queries using variables and slice criteria to define N, n |
| | | | Analysis server stores N, n and user. Invokes analysis engine. | | |
| | | | | Analysis engine queries data server for variables and values for N/n | |
| | | | | | Data server returns variable values for N, n data rows |
| | | | | For each variable, analysis engine farms out a different process calculating significance. | |
| | | | | When all variables are completed, analysis engine returns lists of variable significance and their compressed values for N, n. Next... | |

NEW ANALYSIS AND SOCIAL SHARING, PT2

FIG. 30

| Client | Application Server | Social Server | Analysis Server | Analysis Engine | Data server 3100 |
|---|---|---|---|---|---|
| | | | | ...continued. | |
| | | | Analysis server receives and stores variable significance and compressed values for N, n | | |
| | Application server tells client that analysis is ready and provides ordered variable lists | | | | |
| Client application presents lists of most significant variables | | | NEW ANALYSIS AND SOCIAL SHARING, PT3 | | |
| User chooses variable | | | | | |
| | Application server queries analysis server for variable info for this analysis | | | | |
| | | | Analysis server returns compressed N,n values for the chosen variable | | |
| | Application server caches variable info, prepares visualization criteria. Next... | | | | |

FIG. 31

| Client | Application Server | Social Server | Analysis Server | Analysis Engine | Data server 3200 |
|---|---|---|---|---|---|
| | ...continued. | | | | |
| Client uses criteria to produce visualization | | | | NEW ANALYSIS AND SOCIAL SHARING, PT 4 | |
| User chooses to save visualization to report with caption | Application server communicates visualization criteria to analysis server | | Analysis server stores saved visualization criteria | | |
| User chooses to save analysis with title and visualization thumbnail | Application server communicates report details to analysis server | | Analysis server stores report details | | |
| User chooses to publish analysis or analysis protocol. Client provides publishing options. Next... | | | | | |

FIG. 32

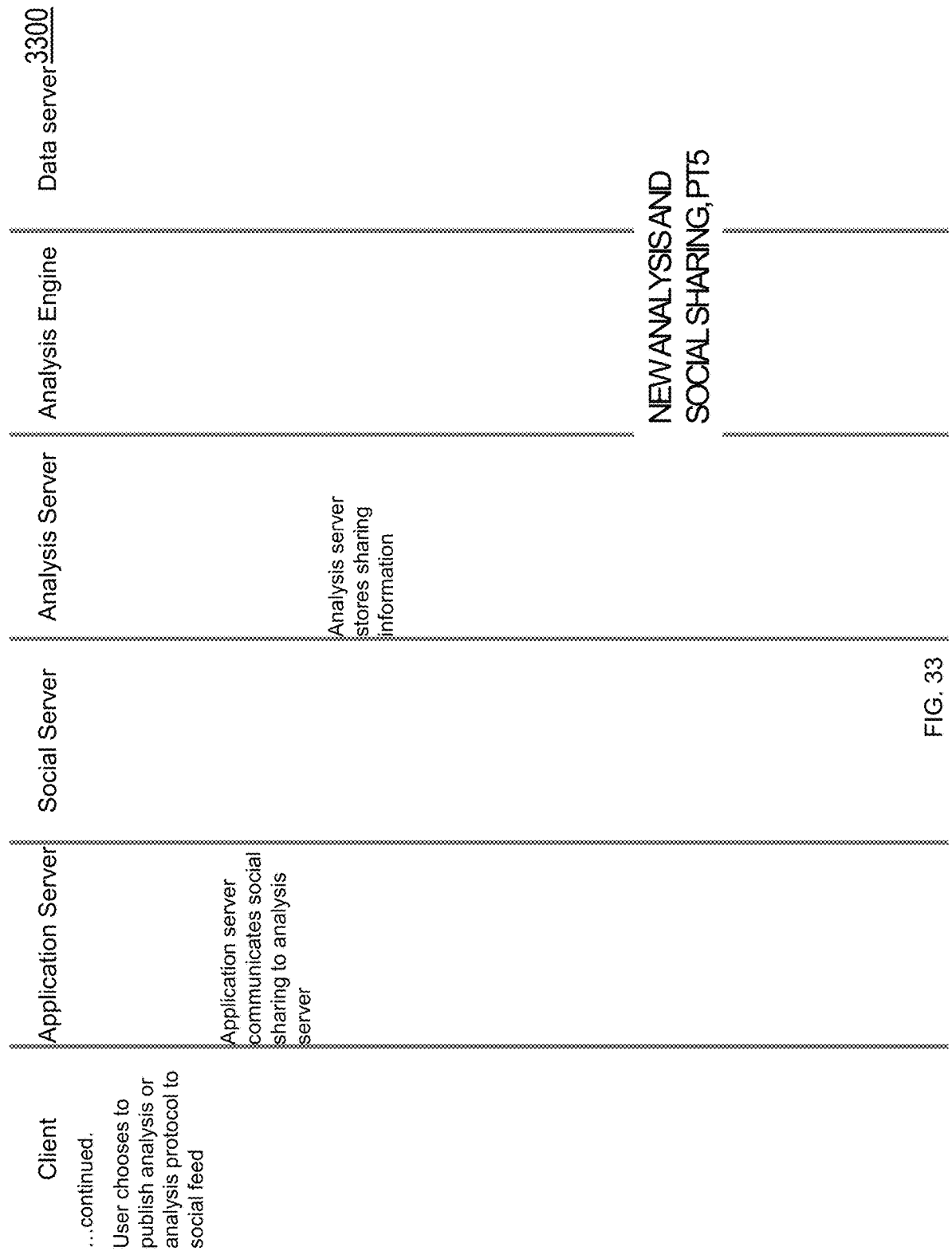

Data server 3400

ANALYSIS DISCOVERY AND SOCIAL FEEDBACK, PT1

Analysis Engine

Analysis Server | Analysis server returns appropriate analyses and protocols with thumbnails, captions. Next...

Social Server | Social server returns follower list

Application Server | Application server queries social server for users that the user follows | Application server queries analysis server for most recent/popular analyses and analysis protocols available to user Client | A different user (follower of the first user) views their social feed

FIG. 34

ANALYSIS DISCOVERY AND SOCIAL FEEDBACK, PT2

| Client | Application Server | Social Server | Analysis Server | Analysis Engine | Data server 3500 |
|---|---|---|---|---|---|
| | Application server queries social server for likes/favorites/comments on each analysis | | ...continued. | | |
| | | Social server returns likes/favorites/comments on each analysis | | | |
| | Application server returns analyses with owners/titles/thumbnails/likes/favorites/comments | | | | |
| Client application displays list of new/popular analyses and analysis protocols to view. User chooses an analysis or protocol to view | Application server queries analysis server for all visualizations for that analysis | | Analysis server returns all visualizations and captions for the analysis. Next... | | |

FIG. 35

ANALYSIS DISCOVERY AND SOCIAL FEEDBACK, PT3

Data server 3600

| Client | Application Server | Social Server | Analysis Server | Analysis Engine | Data server |
|---|---|---|---|---|---|
| | | | ...continued. | | |
| User views visualizations and decides to comment on one | Application server returns all visualizations with captions | | | | |
| | Application server passes comment to social server | Social server stores comment on visualization | | | |
| | Application server issues push notification of comment to owner | | | | |
| User chooses to like a visualization | Application server passes like to social server | Social server stores like on visualization | | | |
| | Application server issues push notification of like to owner. Next... | | | | |

FIG. 36

ANALYSIS DISCOVERY AND SOCIAL FEEDBACK, PT4

| Client | Application Server | Social Server | Analysis Server | Analysis Engine | Data server 3700 |
|---|---|---|---|---|---|
| | ...continued. | | | | |
| User chooses to favorite the analysis | Application server passes favorite to social server | | | | |
| | | Social server stores favorite on analysis. Next... | | | |
| | Application server issues push notification of favorite to owner | | | | |
| User chooses to follow the user who created the analysis | Application server passes on follow to social server | | | | |
| | | Social server saves follow information | | | |
| | Application server issues push notification of follow to owner | | | | |

FIG. 37

| Client | Application Server | Social Server | Classifier Server | Classifier Engine | Data server 3800 |
|---|---|---|---|---|---|
| User chooses new classifier | | | | | |
| | App server returns available datasets | | | | |
| User chooses dataset (MLB) | | | | | |
| Client presents MLB-specific UI | | | | | |
| | MLB-specific module provides cached information for starting MLB analyses (teams, players) | | | CREATION OF A CLASSIFIER, PT1 | |
| User picks a player and "pitch classifier" | | | | | |
| | MLB-specific module provides cached variables and metadata for MLB player pitch analysis | | | | |
| User uses client tools to slice pitch criteria for focus (n), background (N) and outcome variable User chooses "build classifier" | | | | | |
| | App server calls classifier server with outcome variable and slice criteria. Next... | | | | |

FIG. 38

| Client | Application Server | Social Server | Classifier Server | Classifier Engine | Data server 3900 |
|---|---|---|---|---|---|
| | ...continued. | | | | |
| | | | Classifier server queries data server to define N, n | | |
| | | | | | Data server queries using variables and slice criteria to define N, n |
| | | | Classifier server stores N, n, outcome variable and user. Invokes classifier engine. | | |
| | | | | Classifier engine queries data server for variables and values for N/n | |
| | | | | | Data server returns variable values for N, n data rows |
| | | | | Classifier engine builds a predictive model using one or more machine learning algorithms and performs cross-validation to measure performance. Classifier engine returns model parameters to classifier server Next... | |

FIG. 39

CREATION OF A CLASSIFIER, PT2

| Client | Application Server | Social Server | Classifier Server | Classifier Engine | Data server 4200 |
|---|---|---|---|---|---|
| A different user views their social feed and chooses classifier marketplace | | | | | |
| | Application server queries classifier server for most recent/popular classifiers in the marketplace | | | | |
| | | | Classifier server returns appropriate classifiers with titles, N,n criteria, outcome variable, cross-validation results, post-validation results and subscription price. | CLASSIFIER DISCOVERY AND SUBSCRIPTION, PT1 | |
| | Application server queries social server for likes/favorites/comments on each classifier | | | | |
| | | Social server returns likes/favorites/comments on each classifier | | | |
| | Application server returns classifiers with parameters, performance, subscription and social details Next... | | | | |

FIG. 42

| Client | Application Server | Social Server | Classifier Server | Classifier Engine | Data server 4300 |
|---|---|---|---|---|---|
| | | | | CLASSIFIER DISCOVERY AND SUBSCRIPTION, PT2 | |
| Client displays classifiers with parameters, performance, subscription and social details | ...continued | | | | |
| User chooses to search the classifier marketplace for a specific query term | | | | | |
| | Application server queries classifier server given search query | | Classifier server returns appropriate classifiers with titles, N,n criteria, outcome variable, cross-validation results, post-validation results and subscription price. | | |
| | Application server queries social server for likes/favorites/comments on each classifier | Social server returns likes/favorites/comments on each classifier | | | |
| | Application server returns classifiers with parameters, performance, subscription and social details Next... | | | | |

FIG. 43

| Client | Application Server | Social Server | Classifier Server | Classifier Engine | Data server 4400 |
|---|---|---|---|---|---|
| | ...continued | | | | |

CLASSIFIER DISCOVERY AND SUBSCRIPTION, PT3

Client displays classifiers with parameters, performance, subscription and social details User selects a specific classifier and views all details about parameters, performance and social details User chooses to subscribe to classifier and chooses deployment to mobile push Application server communicates subscription to social server Social server records classifier subscription and sets up billing details Application server communicates deployment to classifier server Classifier server stores deployment information with user

FIG. 44

| Client | Application Server | Social Server | Classifier Server | Classifier Engine | Data server 4500 |
|---|---|---|---|---|---|
| | | | | | New data streams in. Data server notifies classifier server and provides row where data changed. |
| | MAKING A PREDICTION WITH A CLASSIFIER DAEMON | | Classifier server checks all active classifiers to see if the data row satisfies criteria for N, n and is missing the outcome variable. If so, classifier server invokes classifier engine with model parameters to predict point. | | |
| | | | | Classifier engine predicts outcome | |
| | | | Classifier engine saves prediction and identifies user(s) for notification with push details | | |
| | Application server pushes notifications to users according to push details | | | | |
| Client receives a push notification and allows the user to navigate to classifier | | | | | |

FIG. 45

| Client | Application Server | Social Server | Classifier Server | Classifier Engine | Data server 4600 |
|---|---|---|---|---|---|
| | | | | | New data streams in. Data server notifies classifier server and provides row where data changed. |
| | | | Classifier server checks all active classifiers to see if the data row satisfies criteria for N, n and contains the outcome variable. If so, classifier server records correctness of previously predicted outcome | | |

RECORDING CLASSIFIER POST-VALIDATION WITH A CLASSIFIER DAEMON

FIG. 46

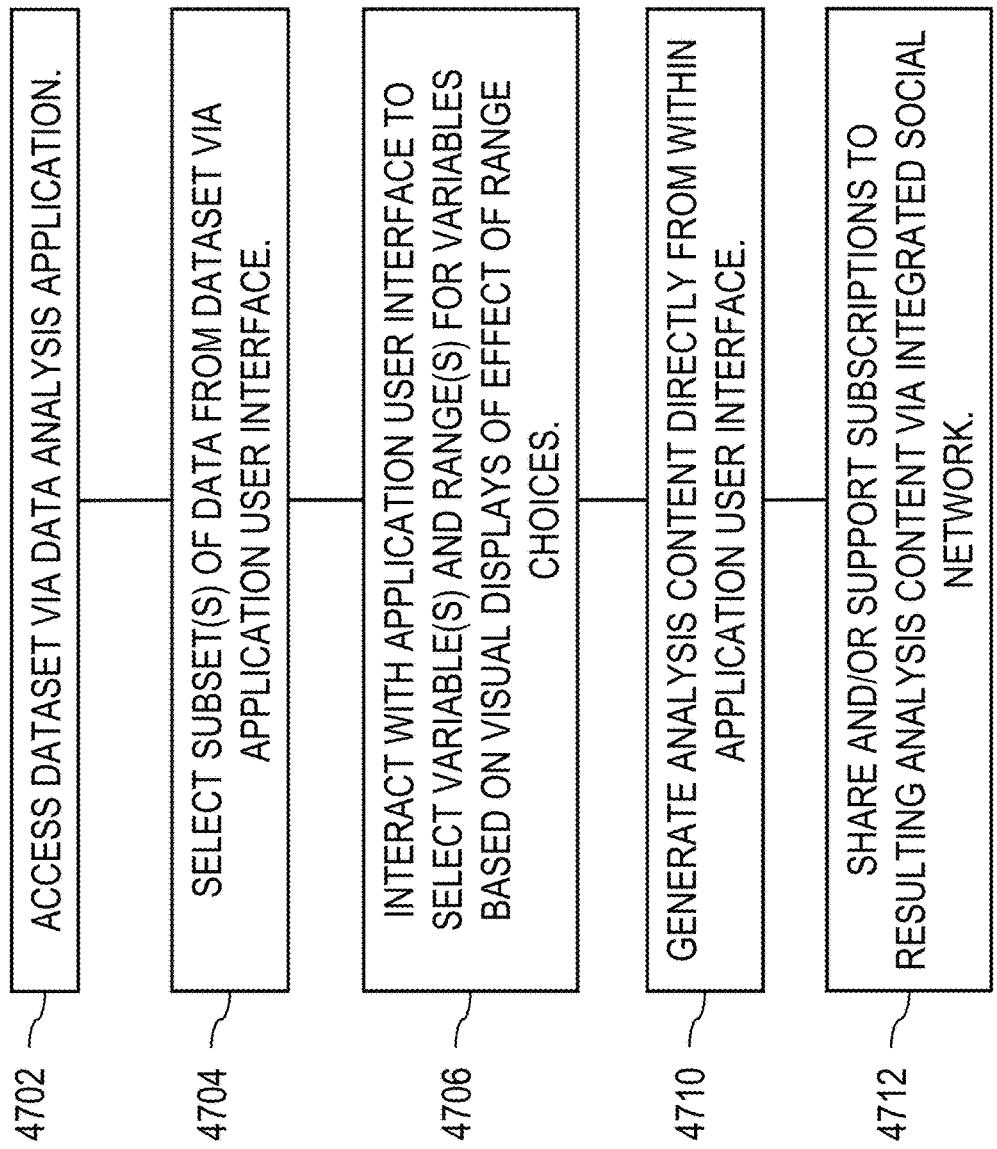

DATA ANALYSIS AND VISUALIZATION

CROSS-REFERENCE TO RELATED APPLICATIONS

The current application claims priority under 35 U.S.C. § 119(e) to provisional application Ser. No. 62/039,349 filed Aug. 19, 2014, the disclosure of which is incorporated herein by reference in its entirety.

TECHNICAL FIELD

The subject matter described herein relates generally to data analysis and visualization.

BACKGROUND

Humans organize things in their environment into semantically meaningful sets. Natural language is one example of a semantically meaningful set. An adjective is an annotation label that can be associated with one or more nouns, and every noun X associated with adjective Y is an element of set Y. Nouns can also be sets themselves. The phrase "X is a Z" can be transformed into the logical concept "noun X is an element of set Z." These natural language principles reflect an aspect of human cognition that has persisted across millennia. In today's computational age, this process of entity-to-set association has exploded into a universe of data.

The actual data warehouses that store information generated in relation to the activities of enterprises, government agencies, social networks, medical or other types of research, sporting events, etc. may be arranged into loose, almost unstructured schemata or complex thousand-table relational database systems. Such models can be transformed into relatively simple schema based assumptions, which can include 1) there are entities that are the focus of domain-specific research (e.g. people, genes, media items), 2) there are potential network connections between those entities (e.g. personal relationships, protein-protein interactions, nearest-neighbor media, hyperlinks), and 3) there are sets of entities, partitioned into set-categories (e.g. San Francisco, Calif. as a set of people-entities is in the location set-category, and the University of California at San Francisco (UCSF) as a set of people-entities is in the alma mater set-category; there may also exist a different set UCSF in the employer set-category).

A schema can be a simple form of a topic map that does not attempt to represent relationships between different sets/topics. For example, a topic map might explicitly model that the employer set/topic UCSF has an is-in relationship with the location set/topic San Francisco, Calif. A schema such as the Exploratory Gene Association Networks (EGAN) schema (described, for example, in "Hypergraph visualization and enrichment statistics: how the EGAN paradigm facilitates organic discovery from Big Data" by J. Paquette et al., *Proc. of SPIE-IS&T Electronic Imaging*, SPIE Vol. 7865, 2011) can provide advantages relating to expectations that a human analyst, such as for example a domain expert, will be interpreting the information. The human analyst can provide his or her own complex mental map about how sets/topics are semantically related. Keeping the schema simple allows for more metadata and sets to be included while keeping the workflow relatively simple for the user.

Entity types that can be grouped into sets (for example as discussed above) can be monitored and researched via collection of empirical data, which can include information from a variety of sources, such as numbers, change rates, clicks, purchases, scores, votes, surveys, ratings, etc. The analytics/prediction industry is evolving right along with the empirical input stream with algorithms for clustering, classification, and prediction, all of which can be parallelized to an array of cloud-based processors in order to find that needle in the haystack as quickly as possible. Many of these algorithms work on matrices of data, where each column in the matrix represents an entity and each row represents a variable that can be measured for each entity. However, current analytics paradigms for large empirical data sets generally confront two issues in addition to the general challenges of storage and parallelization: noise/sparseness and single needle focus.

The issue of noise/sparseness depends on the quality of the data collection process and the consistency and frequency of the variables being analyzed. All empirical data sets have some degree of noise, and even a little noise in the data can raise questions regarding whether a "best-candidate needle" (e.g. an answer to a query or the like) found by an algorithm is really the "correct" needle being sought. Substantial uncertainty can arise about the correctness of the "best-candidate needle" relative other candidates (e.g. the second best, tenth best, etc.). Depending on the number of entities and the strength of the confidence values produced, it can be useful to consider many more candidates than just the top-hit. It may be easy for an analyst to manually investigate one candidate, but extending such an analysis to a top hundred or more candidates can be challenging.

Single needle focus relates to situations in which an investigator is not interested in simply finding just one needle in the haystack but instead wishes to learn how the best candidates from the analysis or how a subset of entities that cluster together are related to each other, and what those relationships indicate about the environment measured in the experiment. The hypothesis that drives this type of experiment is a systems-hypothesis: no individual entity in the environment is as important as different systems (e.g. sets) of entities. Systems-driven knowledge discovery can identify important trends like social trends, purchasing behavior of consumers, hidden drivers of markets, communication flow in networks and novel biological processes in disease.

SUMMARY

Implementations of the current subject matter can support a variety of data analysis and visualization approaches, techniques, and the like, which can provide advantages in usability to analyses based on the EGAN schema or other related schema for analysis of large data sets. Via user interfaces and data handling techniques discussed herein, users can design and implement complicated data analyses and create visualizations to present the results of such analyses, without requiring an understanding the underlying schema, or programming techniques, or the like. In some examples, a social network can be supported for generating, publishing, browsing, and the like of data analyses and visualizations, as well as creation and deployment of analytic or classification (e.g. machine learning) algorithms, which are referred to herein as protocols. Alternatively or in addition, deployment of data sets for "crowd sourcing" of data analysis creation can be supported on servers configured to allow data uploads via accessible application programming interfaces (APIs).

In one aspect, a method includes providing access to a dataset via a data analysis application, receiving selection of one or more subsets of data from within the dataset by the data analysis application, allowing selection of variables and ranges for the variables based on visual displays of the effects on range choices, and generating analysis content directly from within the application user interface without requiring input of underlying data analysis algorithms. The allowing occurs via a user interface of the data analysis application.

In optional variations, one or more of the following features can be included in any feasible combination. The receiving selection of the one or more subsets of data from within the dataset can include receiving a definition of a background data set and a focus set. The selection of variables and ranges for the variables can include defining a classifier protocol based on user input comprising selection of one or more predictive criteria. The classifier protocol can include a predictive model and a user-defined threshold, and a notification can be provided to a user of the data analysis application and/or to another user of the classifier protocol based on a prediction generated by the predictive model constrained by the background data set, the focus set, and the one or more predictive criteria. An integrated social network can be provided via which a user of the data analysis application can shares and/or offer a subscription to the generated analysis content, which can include a classifier protocol via which a subscribing user can receive predictions based on a predictive model, one or more predictive criteria, a background data set, and a focus set defined by a user of the data analysis application for the classifier protocol.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to analysis of sports data, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 11 shows a textual description of a workflow sequence for a build protocols workflow consistent with implementations of the current subject matter;

FIG. 29 though FIG. 33 show example process flow description segments illustrating features of the functional flow for creation of a new analysis and social sharing of the resulting new analysis consistent with implementations of the current subject matter;

FIG. 34 through FIG. 37 show example process flow description segments illustrating features of the functional flow for analysis discovery and social feedback consistent with implementations of the current subject matter;

FIG. 38 through FIG. 41 show example process flow description segments illustrating features of the functional flow for creation of a protocol consistent with implementations of the current subject matter;

FIG. 42 through FIG. 44 show example process flow description segments illustrating features of the functional flow for protocol discovery and subscription consistent with implementations of the current subject matter;

FIG. 45 shows an example process flow description illustrating features of the functional flow for making a prediction with a classifier protocol daemon consistent with implementations of the current subject matter;

FIG. 46 shows an example process flow description illustrating features of the functional flow for making a recording performance of a classifier protocol post-validation with a classifier protocol daemon consistent with implementations of the current subject matter;

FIG. 47 shows a process flow diagram illustrating aspects of a method having one or more features consistent with implementations of the current subject matter;

When practical, similar reference numbers denote similar structures, features, or elements.

DETAILED DESCRIPTION

Figure 1:
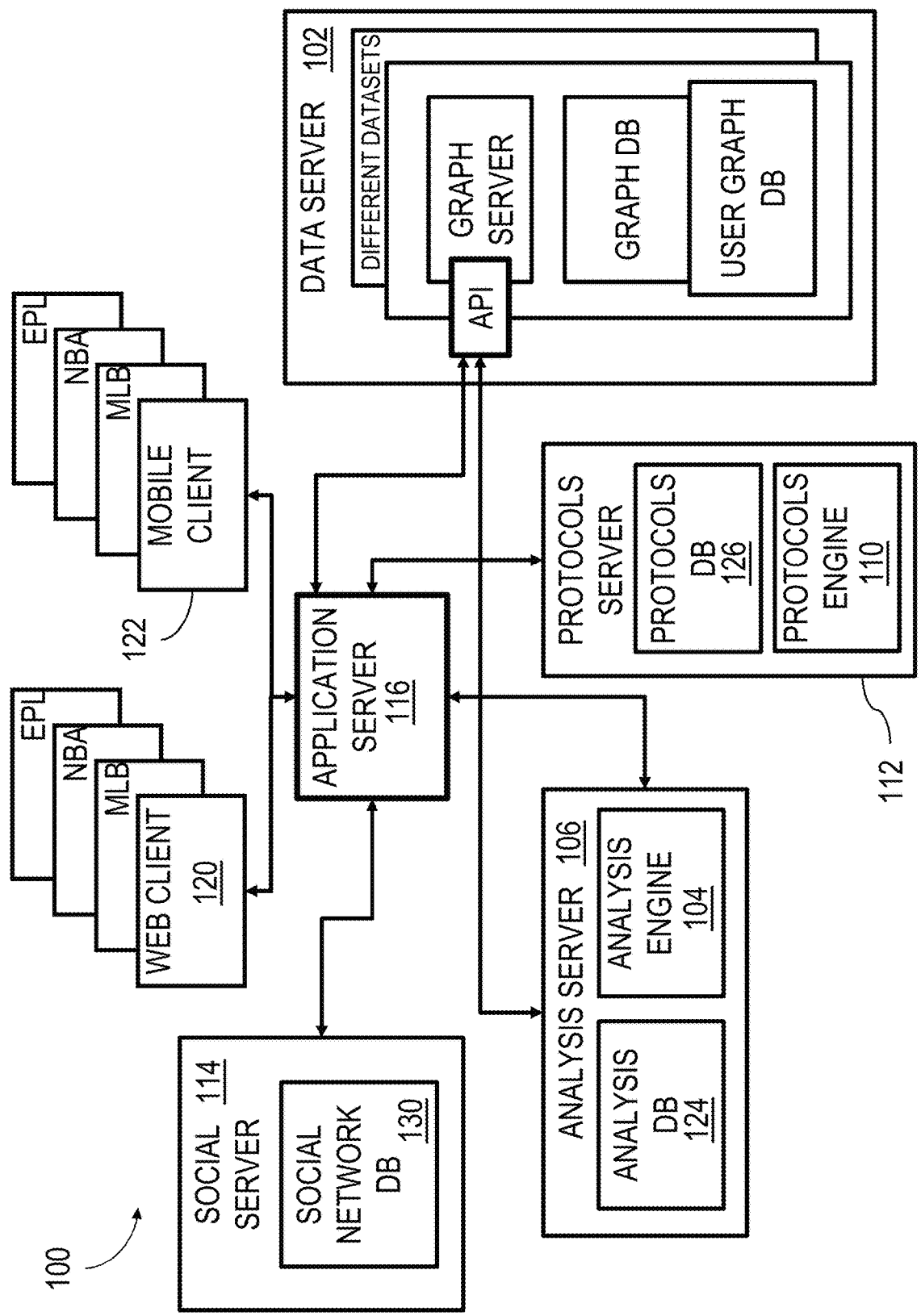
FIG. 1 shows a diagram illustrating features of a computing architecture consistent with implementations of the current subject matter.

In general, the subject matter described herein relates to data analysis and visualization tools, which are advantageously implemented via one or more computer systems, which can optionally be connected by one or more networks. Consistent with implementations of the current subject matter, knowledge discovery approaches can be supported for use with public data sets, private data sets (e.g. data sets with one or more access restrictions), and combinations of public and private data sets. An online forum can be established to facilitate sharing, rating (e.g. for quality, trust, or the like), and even selling and buying of insights, data analysis interfaces, analysis frameworks, protocols, and the like created by a community of users of the knowledge discovery tools. Specific analysis methodologies, referred to herein as protocols, can optionally be created by users based on an intuitive, programming-free user interface that supports selection of background data sets, focus data sets and one or more criteria. Predictive algorithms, referred to herein as classifier protocols, can alternatively or additionally optionally be created by users based on an intuitive, programming-free user interface that supports selection of background data sets, focus data sets and one or more predictive criteria. Classifier protocols can include predictive models as well as pre-programmed (e.g. user-definable) thresholds for providing alerts or notifications to a user based on predictions generated by the predictive model(s). In some non-limiting examples, features of the current subject matter can be implemented using one or more schema consistent with the EGAN approach discussed above.

Gamification features can be incorporated in various implementations to encourage user participation, as well as creation and sharing by users of new visualizations, analyses, protocols, and the like. For example, rating systems can be included to allow other users to like (or optionally dislike), rate, endorse, forward, etc. features created by a user. In some examples, users can be ranked based on likes, favorites, or other feedback provided from other users in relation to published analyses, protocols, etc. In some further implementations, gamification features can also or alternatively include awarding an original creator of a visualization, an analysis, a protocol, etc. with credit or recognition based on visualizations, analyses, protocols, etc. that are determined to have been derived from or otherwise based on the original visualization, analysis, protocol, etc. generated by the original creator (referred to here as "derived works"). For example, the original creator can receive some form of gamification-related credit or other recognition when a derived work is created and can also or alternatively receive at least partial credit or recognition for rankings, likes, favorites, ratings, endorsements, etc. received by a derived work. In some examples, a ranking or rating can be assigned to an original work based on a number of derived works that have been created from the original work.

A computing framework consistent with at least some implementations of the current subject matter can include a data server 102, an analysis engine 104 (which can optionally be part of an analysis server 106), a protocols engine 110 (which can be part of a protocols server 112), a social server 114, and an application server 116. It will be well understood by one of ordinary skill in the art that the functions of these various computational entities can be apportioned among one or more discrete computing systems (e.g. executing on one or more dedicated machines), executed via one or more networked services approaches (e.g. "in the cloud" optionally using a cloud based web service Amazon Web Services or the like), or any combination thereof. Unless required either explicitly or by context, discussion of a function or operation occurring at one or a number of identified servers, engines, systems, devices, etc. should not be taken as limiting the scope of the current subject matter to implementations in which the function or operation can only occur at that specific server, engine, system, device, or the like.

Subject to the disclaimer in the preceding paragraph, and consistent with one or more implementations of the current subject matter, an example of a computing architecture 100 capable of providing at least some of the functionality and features discussed herein is illustrated in FIG. 1. A data server 102 can include a data export application programming interface (API), which can export data, e.g. via Javascript object notation (JSON) or the like to act upon queries from the analysis server 106. The data server 102 can import streaming data via JSON, and can include one or more a structured database, which can include a cloud-based database service, a relational database management system (RDBMS), a graphical database, a columnar database, or the like. The data server 102 can be accessed by Web clients 120, mobile clients 122, and/or other interfaces via the application server 116. In an example relating to sport data analysis and visualization, the Web client 120 and/or the mobile client 122 can include an interface relating to a specific sport, such as for example, baseball, basketball, football, soccer, or the like. In some implementations of the current subject matter, access to the data server 102 can be restricted to other server components discussed herein. Throughout this disclosure, references to JSON are intended to not be limiting. While the descriptions of various illustrative implementations of the current subject matter refer to the use of JSON, it will be understood that such descriptions refer to any asynchronous browser/server communication protocol, which can include JSON, XML, and/or other data formats or the like for supporting stateful, real-time server-to-browser communication.

The analysis engine 104, which is also referred to herein as a dataset hypervisor 202, can in effect operate as the nexus between users, data, and analysis techniques. The dataset hypervisor 202 and/or analysis engine 104 can manage the interaction between user queries, respective data stores, and a variety of analysis methodologies. The analysis methodologies can be an integral part of the dataset hypervisor 202 and/or analysis engine 104, or provided via API to the dataset hypervisor 202 and/or analysis engine 104 from internal or external servers. A dataset hypervisor 202 and/or analysis engine 104 consistent with implementations of the current subject matter can include a statistics engine, which can optionally be implemented via a cloud-based service, or on dedicated machines. A dataset hypervisor 202 and/or analysis engine 104 can be based on one or more programming models, such as for example MapReduce or the like, and can be capable of calculating analysis statistics in parallel. Additionally, the dataset hypervisor 202 and/or analysis engine 104 can include modules for different variable types. The dataset hypervisor 202 and/or analysis engine 104 can also calculate enrichment statistics and can perform one or more statistical tests, such as for example those summarized in the second column of Table 1. Tag overlap can be characterized as a situation in which tagged values overlap with the members of a focus set n more than would be expected by random chance. For numeric variables, this inquiry can involve determining whether the data distributions are significantly different, for example using a T-test, a non-parametric T-test, or one or more other non-parametric tests. Additional features of the dataset hypervisor 202 are discussed in more detail in relation to FIG. 2

TABLE 1

Examples of variable types, statistical tests, and possible visualizations.

| Variable Type | Statistical test for significance given N, n | Potential visualizations |
| --- | --- | --- |
| Tag | Fisher Exact test, Chi-square test, Mutual Information | Bar chart, co-enrichment matrix |
| Previous or future event tag | Fisher Exact test, Chi-Square test, Mutual Information | Bar chart, co-enrichment matrix |
| Numeric | t-test, two-sample nonparametric test, Kolmogorov-Smirnov (KS) test | Box plot, histogram, scatterplot |
| Previous or future event numeric | t-test, two-sample nonparametric test, Kolmogorov-Smirnov (KS) test | Box plot, histogram, scatterplot |
| Spatial | ANOVA, Fisher Exact test, Chi-square test, Mutual Information | Heatmap, Bar chart |
| Previous or future event spatial | ANOVA, Fisher Exact test, Chi-square test, Mutual Information | Heatmap, Bar chart |
| Time series | Kolmogorov-Smirnov test, Survival analysis | Line chart, Kaplan-Meier curve |
| Previous or future event time series | Kolmogorov-Smirnov test, Survival analysis | Line chart, Kaplan-Meier curve |

Referring again to FIG. 1, the analysis server 106 can include a new analysis creation engine, and can manage the creation of a new analysis given a background set (N) and a focus set (n). As with the analysis engine 104, a variety of modules can be supported for different variable types. The analysis server 106 can also include or have access to a saved analysis database 124, which stores N,n and variable statistics. As used herein, N refers to a set of entities from a database upon which the data analysis application is configured to operate and n refers to a subset of N.

The protocols server 112 can implement a protocols creation engine, which can manage the creation of a new protocol given N,n. The protocols server 112 can include or be associated with a saved protocols database 126, which stores N,n and variable statistics, and can also include the protocol engine 110 (which can also be referred to as an active protocols daemon).

The protocols server 112 can also have a classifier protocols daemon for the creation of classifier protocols. The protocols server can train a model to recognize whether x, an element of N, belongs in set n. As such, when a new element, X, is input into the data server 102, the classifier protocols daemon can decide if x is member of N, and if so, predict if x belongs in focus set n. When information is input into the data server that contains the "true answer," whether or not x is an element of n, then the classifier protocols daemon will record the true answer. The classifier protocols daemon can perform functions that can include determining whether x belongs in N, subsequently predicting if x belongs in n, and recording the true answer about whether or not x actually belongs in n. As noted above, a classifier protocol can be defined to include a threshold or some other criteria indicating that a notification (e.g. a text message, an e-mail, an alert provided to a mobile device or computer, etc.) is to be generated to be sent to the user who created the classifier protocol and/or one or more other users of the classifier protocol when the threshold or other criteria are met by a prediction generated by the predictive model of the classifier protocol as constrained by the background data set, the focus set, and any predictive criteria defined by the user for the classifier protocol.

The social server 114 can implement a social network import API server, which listens for social connections and interactions via JSON, and a social export API server, which returns social connections and interactions via JSON. The social server can also include or be associated with a social database 130 for storing social connections and interactions and can record information about social interactions in the software (e.g. likes, comments, favorites, subscriptions, follows, etc.).

A user server, which can optionally be part of the data server 102 can include or be associated with both of a user database and a user activity database for storing various information about user activity. User activity can be tracked and the tracked activity data can be used for displaying to following users on an activity feed, for example for providing information to the application server 116 about when to notify users of new analyses regarding topics (e.g. in a sports data example, teams and players, etc.) that they currently follow, for evaluating user experiences, for creating metrics of user engagement, and the like.

The application server 116 can implement a client API server, which listens for client requests via JSON and returns a response in JSON, and a public export API server, which can provide a public-facing API for serving data via JSON. The public export API server can be separate from a private API, and can optionally provide read-only access to data.

Dataset-specific application modules can also be included, such as for example additional dataset-specific client API server, dataset-specific caches, and the like.

Figure 2:
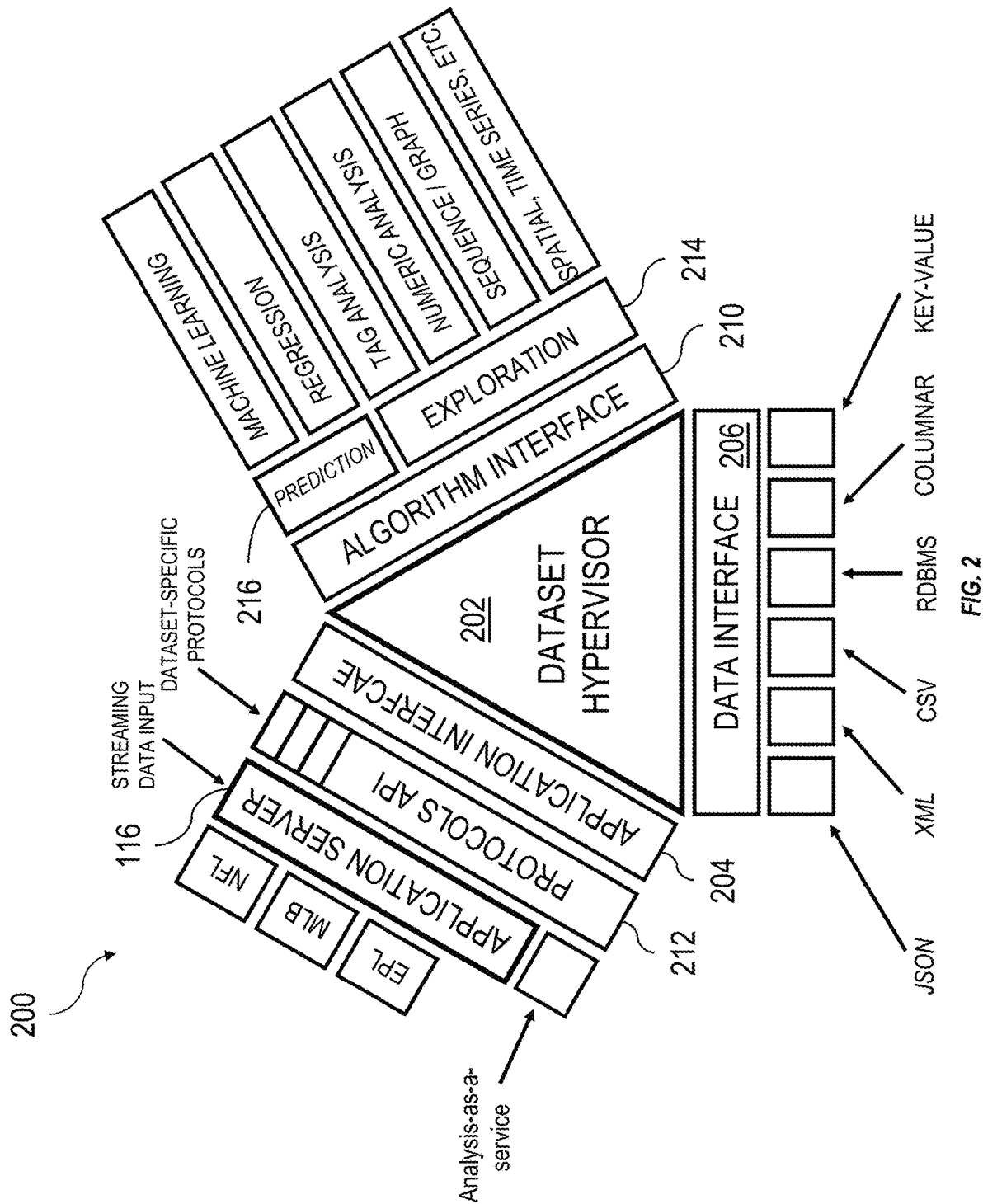
FIG. 2 shows a diagram illustrating features of a dataset hypervisor consistent with implementations of the current subject matter.

Certain functionality described above can be implemented consistent with the architecture 200 shown in FIG. 2, for example using the dataset hypervisor 202 as a hub for managing interactions between an application interface 204 (which can be a script or script-based API), a data interface 206, and an algorithm interface 210. The application interface 204 can provide functionality including a protocols API 212, which can interface with one or more dataset-specific protocols, an application server 116, which can process streaming data inputs. In the example shown in FIG. 2, the dataset hypervisor 202 is configured for a sports-based application, so the streaming data inputs can include one or more proprietary or public data streams relating to sports data from one or more sports organizations, leagues, etc. The application server 116 can also support analysis-as-a-service features, which can allow subscribers, customers, or the like to make use of cloud-based analytics services.

The data interface 206 can support import and/or export of data via any of a number of protocols, including but not limited to JSON, XML, comma-separated values (CSV), a relational database management system (RDBMS), columnar data, key value data, or the like.

The algorithm interface 210 can include features for supporting analytical processes such as explorations 214, predictions 216, etc., which can include a variety of analytical processes such as machine learning; regression; tag analysis; numeric analysis; sequences/graphs; spatial, time series, etc.; and the like.

Figure 3:
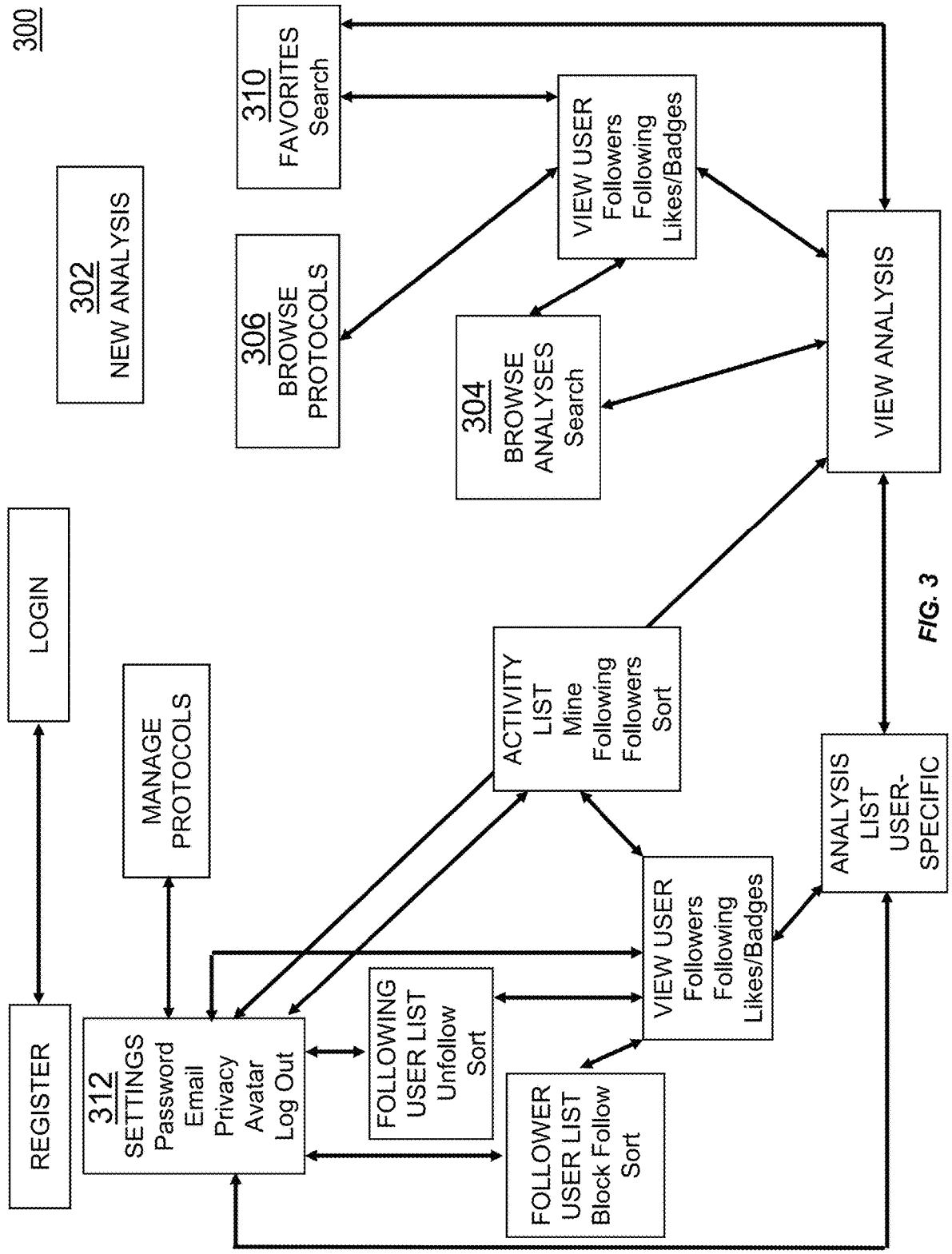
FIG. 3 shows a diagram illustrating workflows via which a user can interact with a user interface consistent with one or more implementations of the current subject matter.

FIG. 3 shows a diagram 300 illustrating several possible workflows via which a user can interact with a user interface consistent with one or more implementations of the current subject matter. As noted above, the user interface can advantageously be "programming-free," which refers generally to a user interface having features that do not require a user to understand programming languages in order to construct an analysis, a protocol, or the like. Further uses herein of the term "user interface" should be interpreted with this meaning unless such an interpretation is explicitly or contextually inconsistent with the provided description. Various workflows can originate from buttons (e.g. hardware buttons, or "soft" buttons on a touch screen or other electronic display that a user can operate or activate by touch of a finger, stylus or the like or by positioning a cursor over the appropriate screen area and clicking a mouse, a trackpad, or the like. In some examples, workflows can be initiated by keyboard input, by voice activation, or any other approach or technique by which a computing device can receive user input. As illustrated in FIG. 3, possible workflow paths can include one or more of new analysis, browse analyses, browse protocols, favorites, and settings. The new analysis workflow 302 is discussed in greater detail in relation to FIG. 4.

A browse analyses workflow 304 can include one or more links for displaying a feed of analyses from the user as well as analyses published by other users whom the user is following. The feed can be filtered by a search. The user can toggle the display of public analyses from other users whom the user is not currently following. In some implementations of the current subject matter, a user can be allowed to designate one or more topics that the user wishes to follow. As an example, if an analysis involves a particular slice of data (e.g. a specific player or team in a sports data analysis implementation), that analysis can automatically be tagged with a topic. A user can be able to follow other users, as well as topics, and thereby receive notifications and view analyses in his or her news feed when followed users produce new analyses or tag new or existing analyses with a topic.

A browse protocols workflow 306 can include one or more links for displaying available protocols created by the user as well as protocols published by others users whom the user is following. The user can toggle the display of public protocols from other users whom the user is not currently following.

A favorites workflow 310 can enable a user to choose to "favorite" analyses, and to provide one or more quick links to the list of analyses that they have "favorited."

Settings workflows 312 can enable a user to change preferences for, among other options, privacy settings, change password or avatar photos or other profile information, and the like. The settings workflow can include links to analyses that the user has performed and/or protocols that the user has created and/or subscribed to, the activity of the user and other users who are following the user or whom the user has followed. Links can also be included to the list of users that the user is following and to the list of users that are following the user. Additional setting features can include ability to perform one or more of adding or deleting followed or following users, designating or un-designating one or more analysis owned by the user with a topic, following or un-following a topic, etc.

Figure 4:
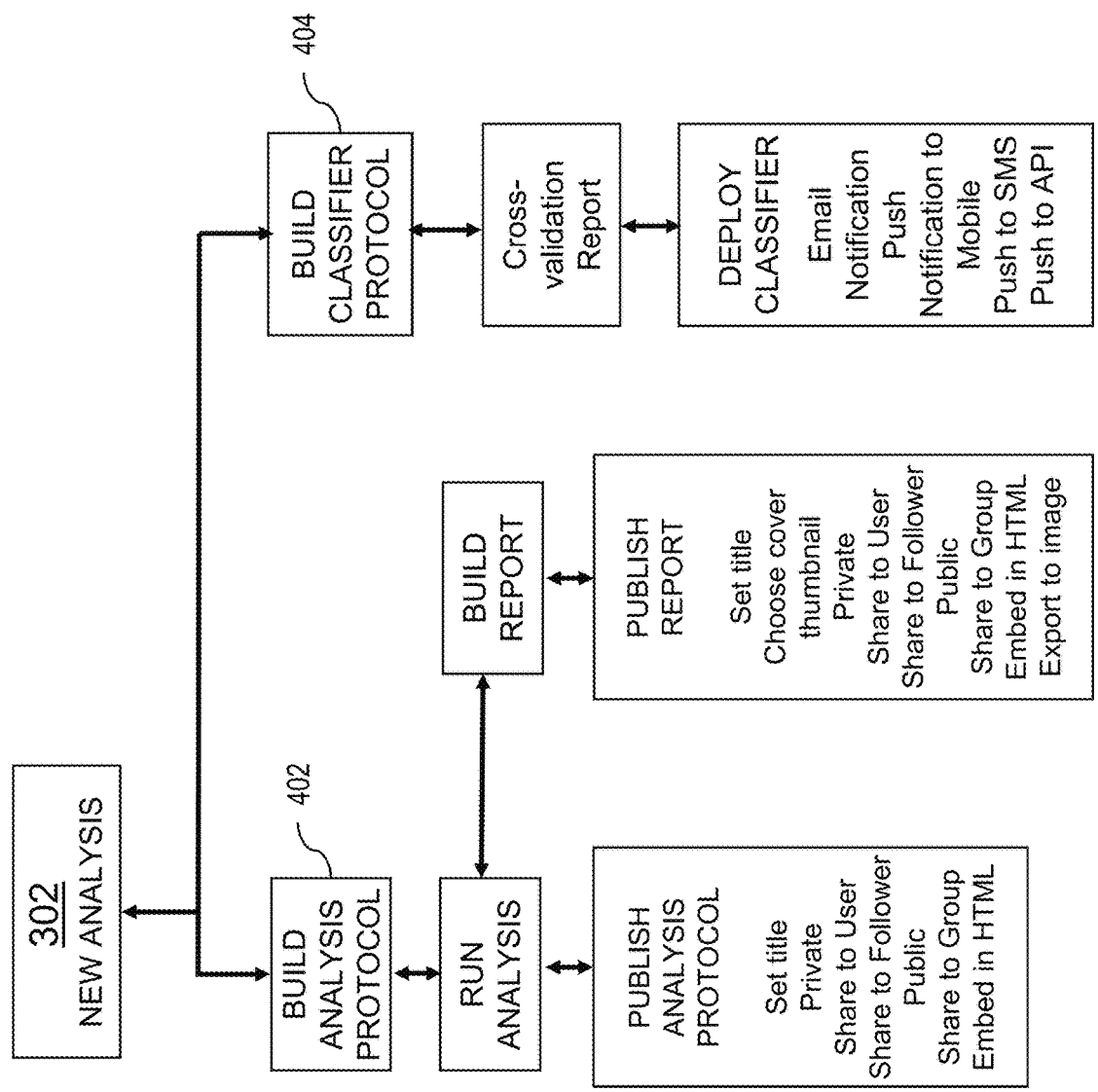
FIG. 4 shows a diagram illustrating features of a new analysis workflow consistent with one or more implementations of the current subject matter.
Figure 5:
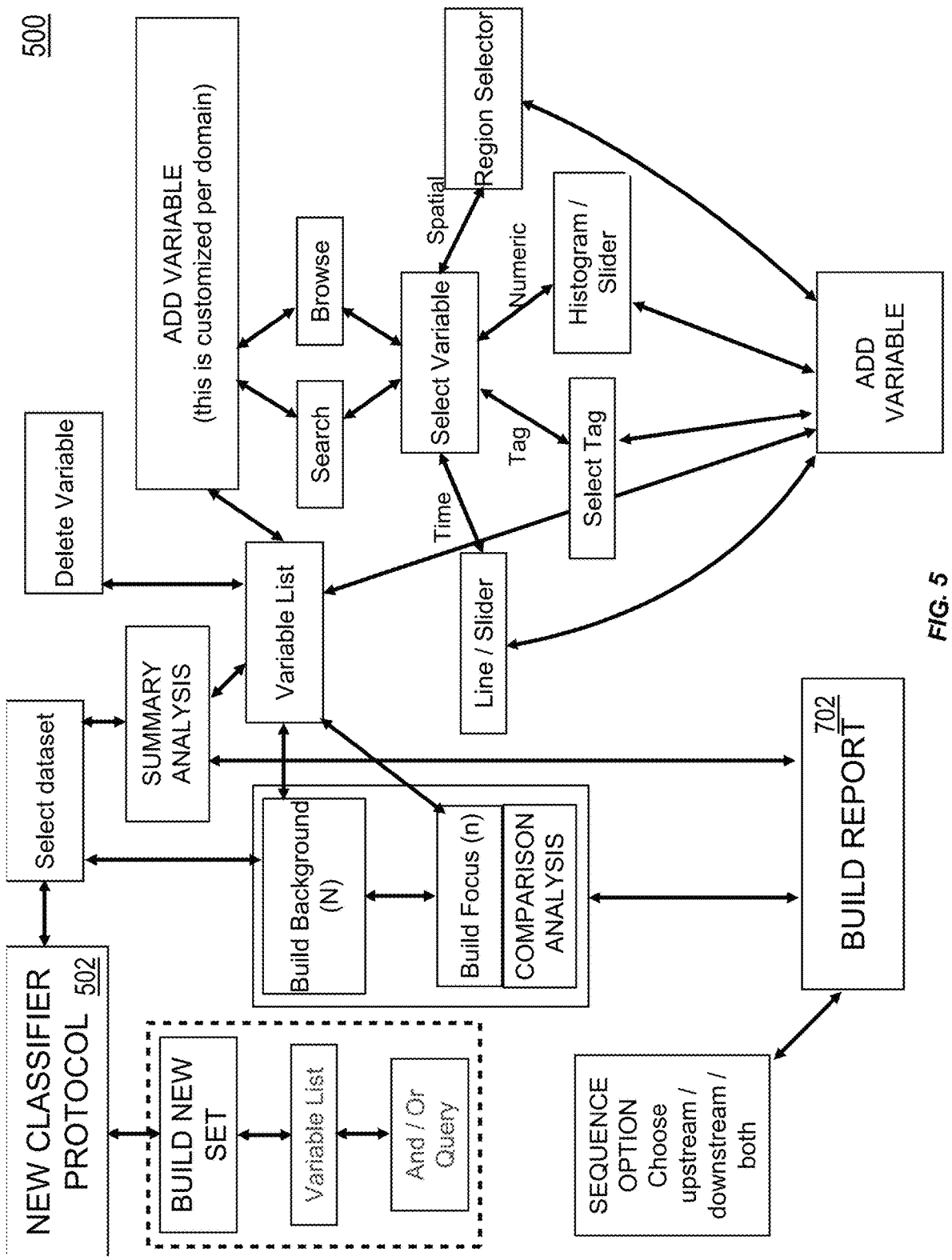
FIG. 5 shows a diagram illustrating features of a new classifier protocol workflow consistent with implementations of the current subject matter.
Figure 6:
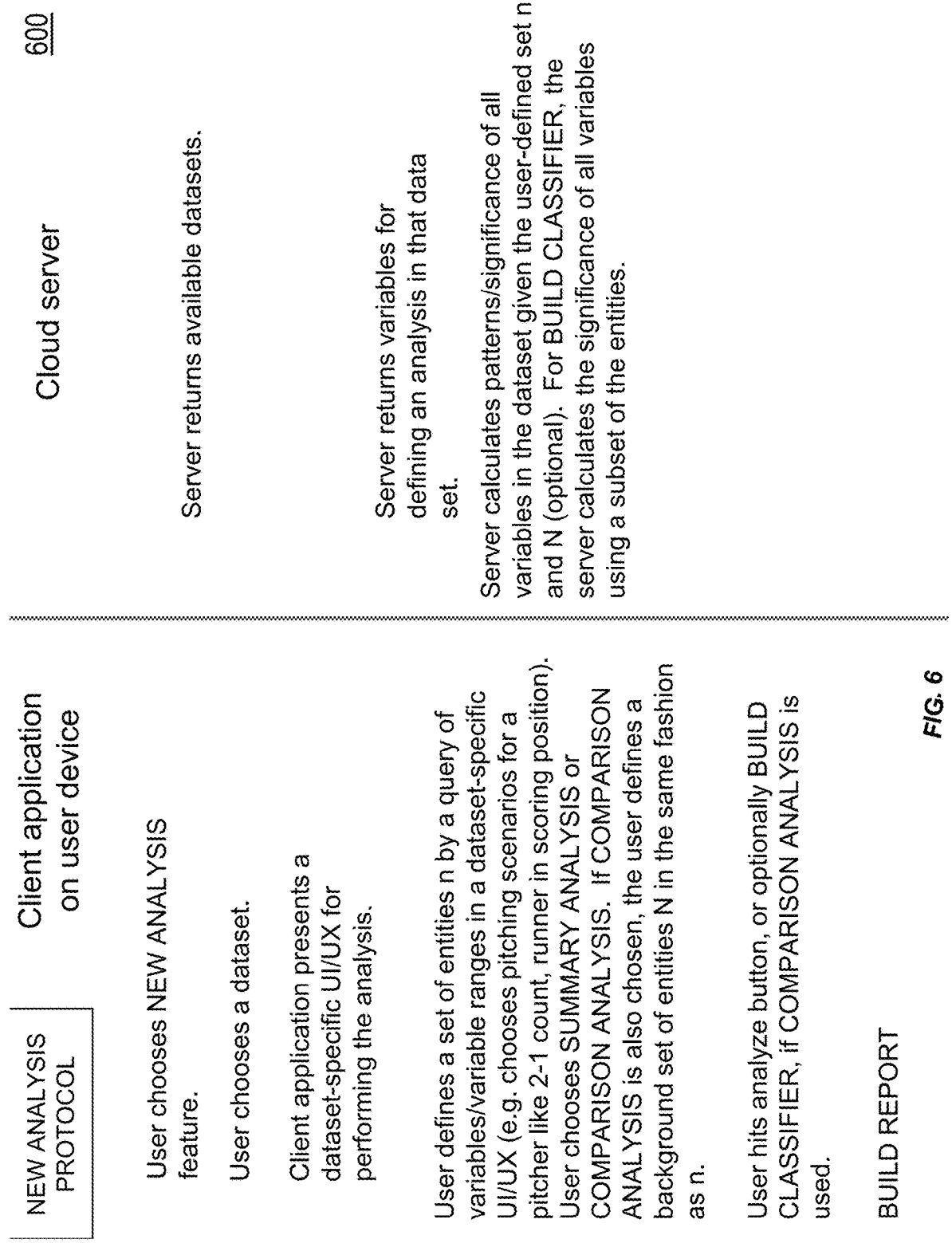
FIG. 6 shows a textual description of a workflow sequence for a new analysis listing consistent with implementations of the current subject matter.

FIG. 4 shows a diagram 400 illustrating features of a new analysis workflow 302, FIG. 5 shows a diagram 500 illustrating features of a new classifier protocol workflow 502, and FIG. 6 shows a textual description 600 of a workflow sequence for a new analysis listing operations occurring both at a client application (used herein to describe a Web application such as one operating using Java or other languages within a Web browser, a mobile device app, a native application running on a mobile device or other client machine such as a desktop or personal computer or a tablet, or the like) executing on a user device and at one or more servers, which can optionally include a cloud-based server. The new analysis workflow 302 can allow a user to create a new analysis protocol 402 or to build a classifier protocol 404. Use of this feature can involve building new content (e.g. analyses, protocols, visualizations, etc.), which can optionally be consumable by others, for example via a social network built around data analysis and sharing of such content. The new analysis workflow path can lead to creation of new content to be made available across the social network, while other workflows can lead to consumption of the content, management of social network preferences, or management of user-specific settings.

The new classifier protocol workflow 502 can include selection of a dataset, creation of a summary analysis, and building of background and focus sets (N, and n, respectively). A summary analysis can include the features detailed on the right side of the diagram 500 of FIG. 5. As shown on the far left side of FIG. 5, the new classifier protocol workflow 502 can also include building of new data sets, for example via defining of variable lists, and/or queries, and the like.

Using workflows having at least some of the described features generally result in the creation of reports, protocols, etc. that provide content for other users to consume. In general, analysis types can include a simple version (e.g. a summary analysis) and more advanced versions (e.g. a comparison analysis). A summary analysis can be built to let a user focus on one set of entities in the database. The workflow can be built to help the user drill down to the most applicable set (e.g. curveballs from a specific pitcher, outcomes on swings in at bats that reach a two-strike count, and the like). A comparison analysis can be built to help a user compare a focus set of entities to a background set of entities (e.g. curveballs from a picture that resulted in swinging strikes compared to a background of all curveballs from the pitcher).

Both summary and comparison analyses can direct the user into a same workflow, in which the user defines a set of entities by creating a complex query of one or more variables. Different workflows can be provided for different types of variables.

Once the required sets are defined (e.g. one set for a summary analysis, two or more sets for a comparison analysis), the workflow can proceed to a build report workflow. The user can also have the option to allow entities that are linked to the selected entities in the upstream/downstream/both, that is, only when the entities can be linked together in a graph with directed edges. A build new set option can be provided for advanced users. This option can allow a user to create sets using a more complex query structure (e.g. selective AND and OR groupings).

Figure 7:
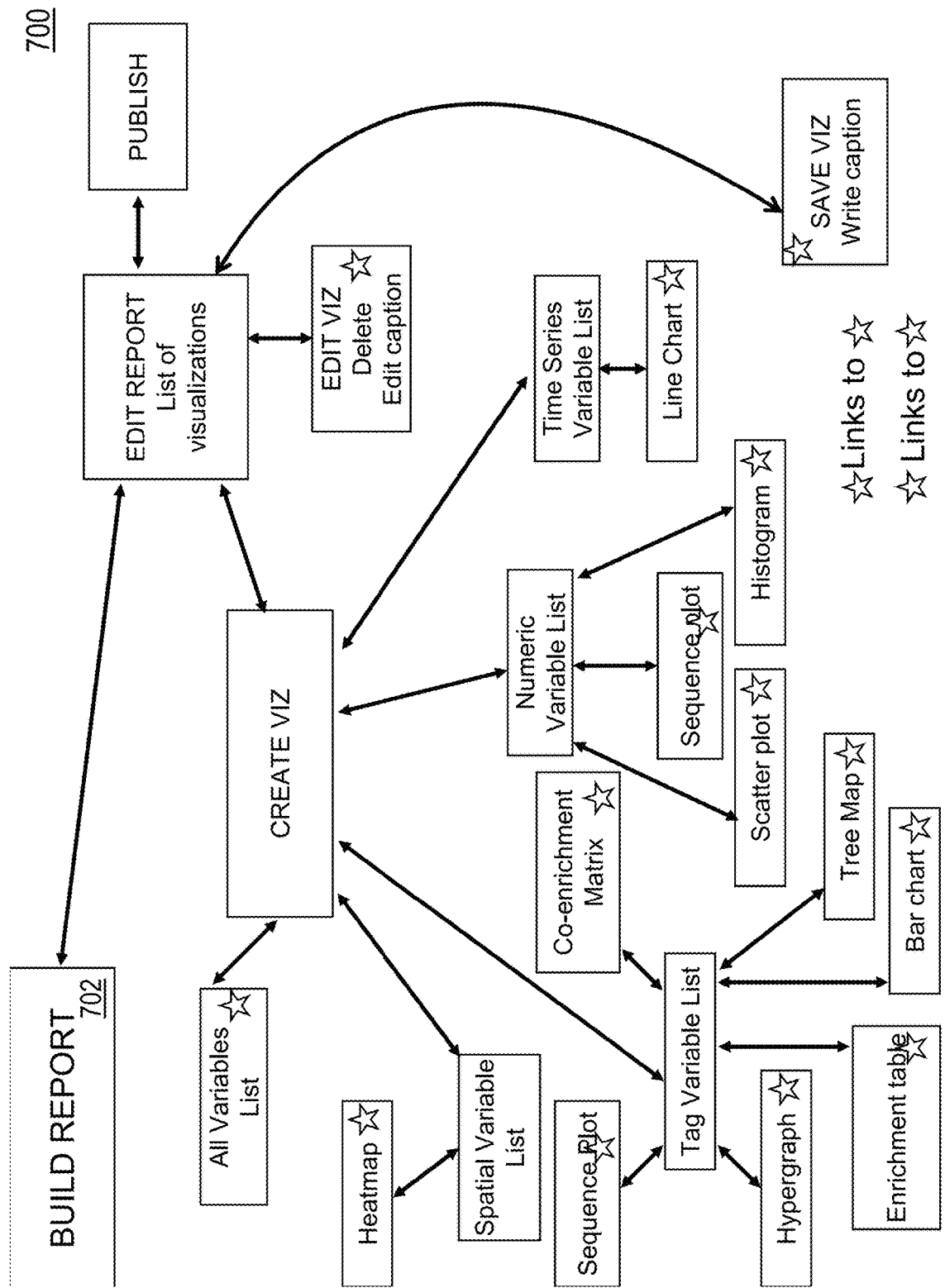
FIG. 7 shows a diagram illustrating features of a build report workflow consistent with implementations of the current subject matter.
Figure 8:
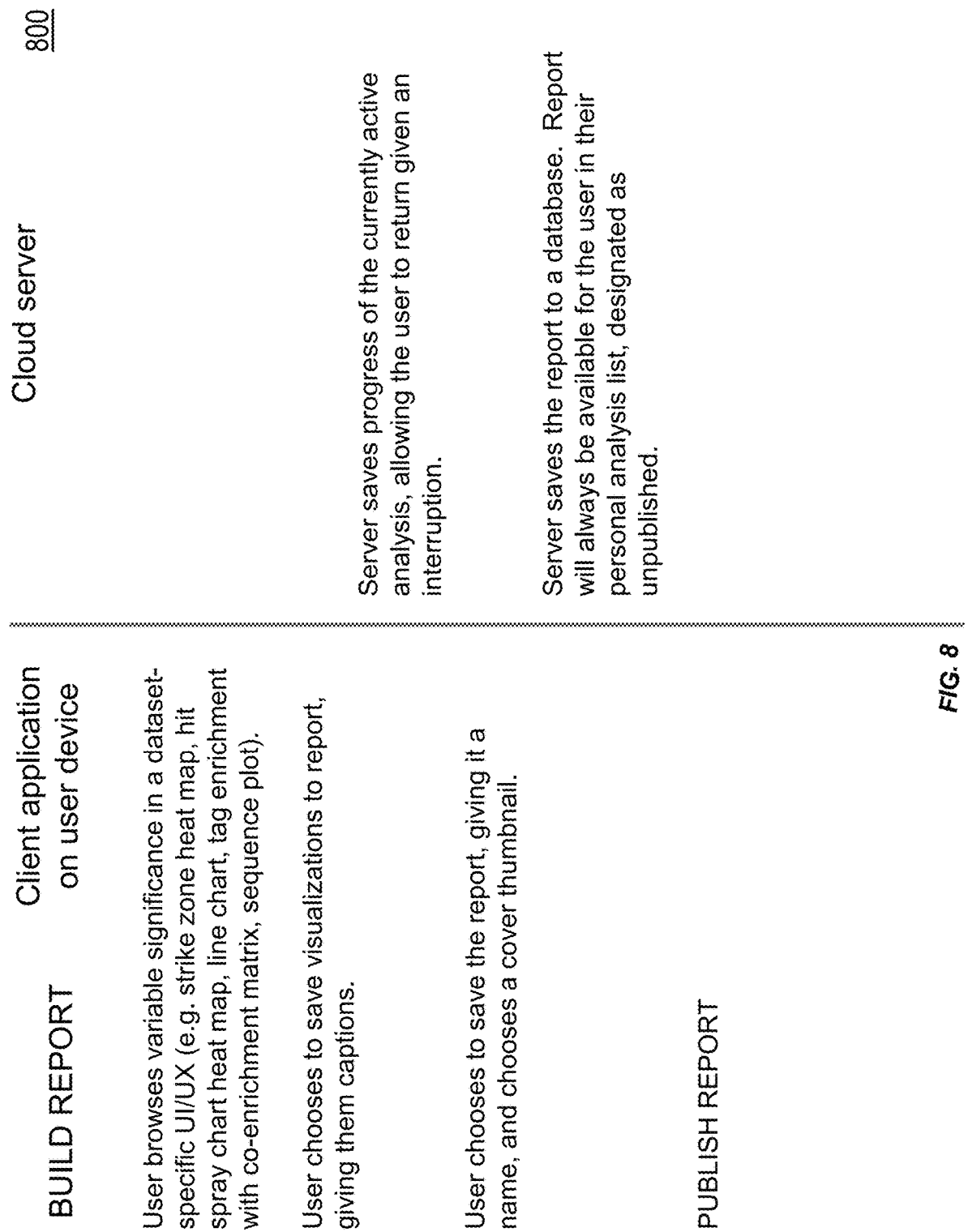
FIG. 8 shows a textual description 800 of a workflow sequence for a build report workflow consistent with implementations of the current subject matter.

FIG. 7 shows a diagram 700 illustrating features of a build report workflow 702, and FIG. 8 shows a textual description 800 of a workflow sequence for a build report workflow listing operations occurring both at a client application and at a server. A report can be a collection of visualizations (e.g. with captions), given a title and a selected visualization as a cover image. To create visualizations for a report, a user generally explores the significance of different types of variables (e.g. spatial, tag, mutually exclusive tag, numeric, time series). If there is an N/n (i.e. a "comparison" of background and focus sets) analysis, the system can automatically calculate the significance of relationships between every variable in the dataset and the N/n analysis. In some implementations, a user can link an analysis to anther analysis, for example to make the analysis a response to the other analysis, a further extension of the other analysis, etc. Additionally or alternatively, an analysis can be automatically linked to another analysis based on similarity of the two analysis, a determination that one analysis is a derived work of the other analysis, because a new analysis was initiated based on parameters appearing in an earlier analysis (e.g. a same N, n), or the like.

The user can be presented with a list of significant variables, which can be sorted by significance, and can be allowed to filter that list by variable type or by text search. If there is no N/n analysis (i.e. if the analysis is a "summary"), then the variable lists will not be sorted, but still searchable/filterable. For dataset-specific interfaces, the user can automatically be shown a list of commonly used visualizations (e.g. a strike-zone heat map, a hit-spray chart, etc. for baseball-related data). The third column in Table 1 above lists examples of possible visualizations that can be used for various variable types consistent with one or more implementations of the current subject matter.

After choosing a variable, a visualization can be created showing that variable (different for variable type) and how it relates to the N/n "comparison" analysis, or purely a summary for the "summary" style analysis. Spatial variables can be shown as a heat map. Tag variables can be displayed as a sequence plot, as a hypergraph (good for two or more selected variables), as a co-enrichment matrix (e.g. for two or more selected variables), as a tree map (e.g. if they are mutually exclusive tags) showing all variables for that tag type, or the like. Numeric variables can be displayed as scatterplots (e.g. for two or more variables), histograms (one variable), sequence plots, or the like. Time series variables can be displayed as a line chart. As noted above, some illustrative examples of visualizations are listed in Table 1.

Once a user has created a visualization that he or she wishes to save, the user can do so and also be given the option to add it to the report. A user can manage all visualizations that are created for the report, editing their captions, etc. After creating a set of visualizations with captions, the user can generate a title for the report and choose a visualization to be the cover image. The user can also link an analysis to a different analysis. In some examples, this linking can occur at the start of the process for creating a new analysis, or at other stages of the process or even after the process has completed.

If a user chooses to publish a report, options can include sharing via e-mail, sharing to one or more specific users, publishing to followers of the user, publishing to the public, embedding in HTML, exporting to an image, sharing via social media, and the like. For example, tagging can be based on one or more relationships automatically, e.g. being a member of a team, having a certain number of fantasy sports points in a given period, etc.

For sharing via e-mail, the user can specify one or more e-mail addresses. The server can enable accounts with the specified e-mail addresses to have view rights on the analysis. These permissions can optionally be revocable by the user, for example by action of the user at a future time, by the user specifying a time period or a date after which the view rights expire, or the like.

The server can send an e-mail to the specified address(es) with a brief description, a cover image, and a link to launch a mobile or web application for viewing and/or modifying the shared analysis. When the recipient launches the application, if they have an account and are logged in, the application can immediately display a view analysis screen for the created analysis. If the recipient does not have an account or if the application is not currently logged into an existing account, a prompt can be shown to encourage the user to register and/or login. Upon successful registration or login, the application can display the view analysis screen for the created analysis.

For sharing to one or more specific users, the user seeking to share an analysis can specify one or more usernames. The server can enable the specified usernames to have view rights on the analysis. As with the share via e-mail option, access permissions can be revocable or can have a finite viewing period. The server can send a push notification to the application for the specified recipient(s) and/or an e-mail, a text message, or some other form of notification, depending on recipient preferences.

If the notification is via e-mail, the process described above can be followed. If a push notification is used, the recipient can activate the push notification (e.g. via tapping on an appropriate part of a touch screen, by activating a physical button or other control, by action of a cursor and mouse or other pointer device, by one or more keyboard commands, or the like. This action can launch the application to display the view analysis screen for the shared analysis.

For publishing to followers, the server can allow all followers of the user to have access to the analysis. The analysis can become visible on an analysis list following screen for followers of the user. These permissions can be revocable by the user as discussed above.

For publishing to the public, the server can enable all users to view the analysis. The analysis will become visible on the analysis list following screen for followers of the user as well as the analysis list public screen for all users. These permissions can be revocable by the user as discussed above.

For embedding in HTML, the application can generate a HTML document that contains specifications for a web browser to display a HTML version of the analysis embedded in another HTML web page (e.g. a blog page). The HTML document can be displayed in a text field in the application and copied to the clipboard of the user's client device.

For exporting to an image, the server can generate an image file, which can optionally be a high-resolution PNG and/or PDF document, of the produced analysis and pushes it back to the user's client device, where it can be downloaded.

For sharing via social media, the user can specify one or more services for sharing. The server can enable sharing through the respective services' APIs and interfaces, with view rights managed via the respective social media services' settings.

Figure 9:
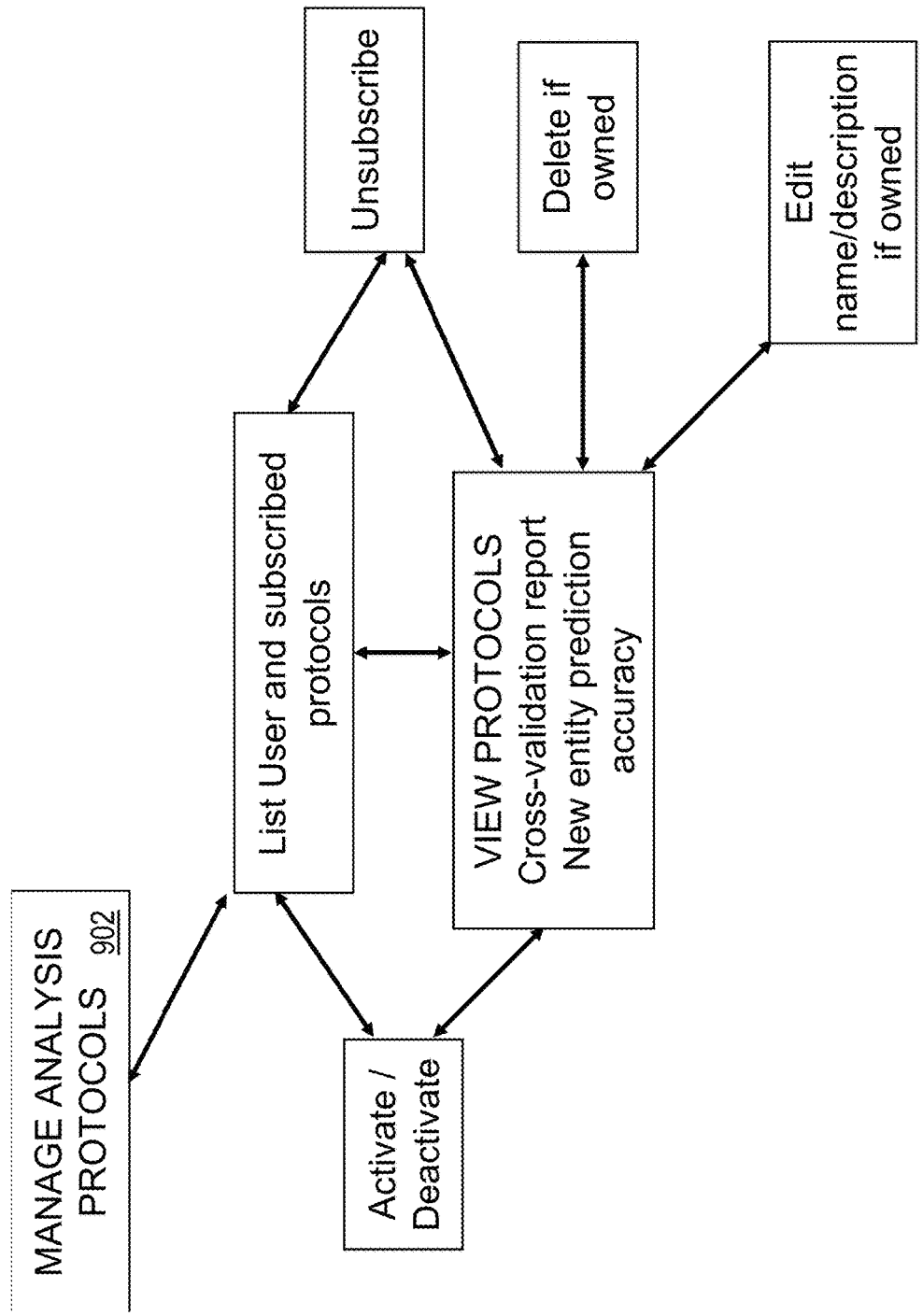
FIG. 9 shows a diagram illustrating features of a manage analysis protocols workflow consistent with implementations of the current subject matter.
Figure 10:
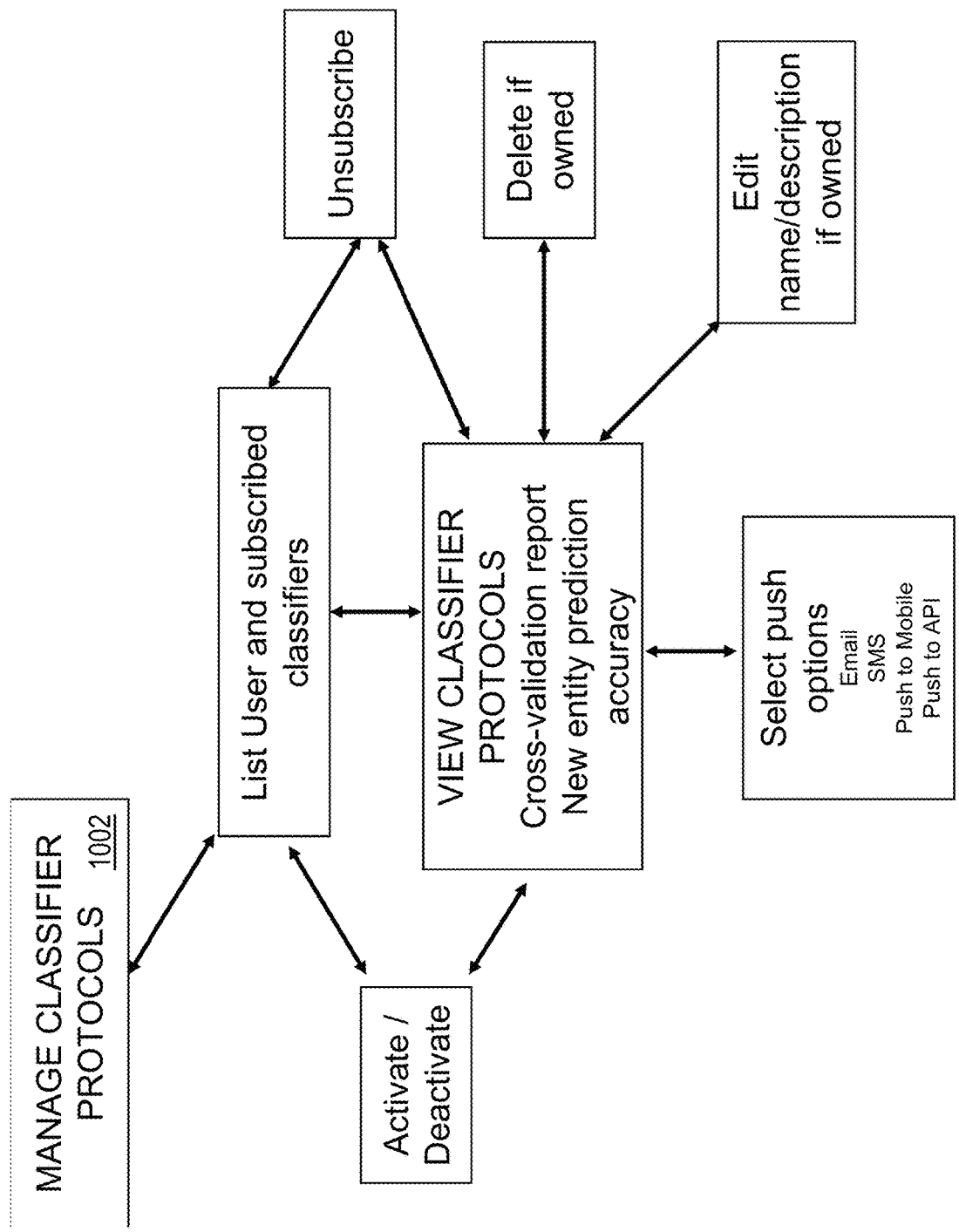
FIG. 10 shows a diagram illustrating features of a manage classifier protocols workflow consistent with implementations of the current subject matter.

FIG. 9 shows a diagram 900 illustrating features of a manage analysis protocols workflow, FIG. 10 shows a diagram 1000 illustrating features of a manage classifier protocols workflow, and FIG. 11 shows a textual description 1100 of a workflow sequence for a build protocols workflow listing operations occurring both at a client application and at a server. With reference to FIG. 9, a user can select a "manage protocols" function via the application. The user can be listed, as can the protocols to which the user is subscribed. The user can be provided with options for activating or deactivating one or more protocols, where an activated classifier protocol can be one that provides predictions via the application based on observed input data. A user can also choose to unsubscribe to one or more protocols. A view protocols function can provide cross-validation reports, which can be used in ranking or evaluating protocols. For example, performance of the predictions of a classifier protocol can be displayed relative to actual outcome of the predicted events. Other functions can be accessed, for example a protocols deletion (e.g. if the user is the owner/creator/etc. of the protocols), a protocols name edit, or the like. The manage classifier protocols workflow 10001 of FIG. 10 is similar to that of FIG. 9 but adds the feature of allowing selection of push options for notifying a user of events, results, etc. as defined in a classifier protocol.

In some example implementations of the current subject matter, the subscription concept can be extended to include allowing a user to follow or subscribe not just to analysis from other users, but also or alternatively to analysis relating to specific data content. The user can identify the specific content on a watch list or via some comparable functionality. For example, in a sports-related example, a user could choose to subscribe to all analyses relating to a group of players, to a specific team, to a specific sport, or the like. In a financial application, a user can be allowed to subscribe to all analyses relating to a specific industry, a specific company or group of companies, etc. Other examples for other types of data are also within the scope of the current subject matter.

Consistent with this feature, the user can receive a notification, which can be by e-mail, SMS, pushed message from the application, etc., and which can provide a link or other navigation to a new analysis published by another user and relating to the specific data content on the user's watch list. This feature can allow the application to be useful as a tool for broadcasting new analytical insights to a wide-ranging group with ease. The topics approach discussed above can also be used as a tool for broadcasting new analytical insights as a user can receive updates, new analysis, discussion, etc. relating to topics that the user follows.

Sharing options, such as for example those discussed above for analyses, can also be available for protocols. For example protocol sharing or "push" options can include pushing via e-mail, pushing to mobile, pushing to SMS, pushing to API, or the like. For pushing via e-mail, a report can be sent to one or more qualifying owner e-mail addresses. A link can be provided to launch the (mobile/web/etc.) client application for further investigation. For pushing to mobile, a push notification can be sent to one or more qualifying owner mobile device. If the user clicks/touches the notification, the mobile client application launches and provides the interface for further investigation. For pushing to SMS, a SMS can be sent to one or more qualifying owner mobile devices or other devices capable of receiving such messaging. A link can be provided to launch the (mobile/web) client application for further investigation. For pushing to API, the server can open a URL connection to the user-specified URL. Using the user-specified API key, the server can send a message to the URL in a format defined by a protocol API specification, which contains the result of the classified entity. The remote system can respond with a confirmation of receipt and a success/error notification.

Figure 12:
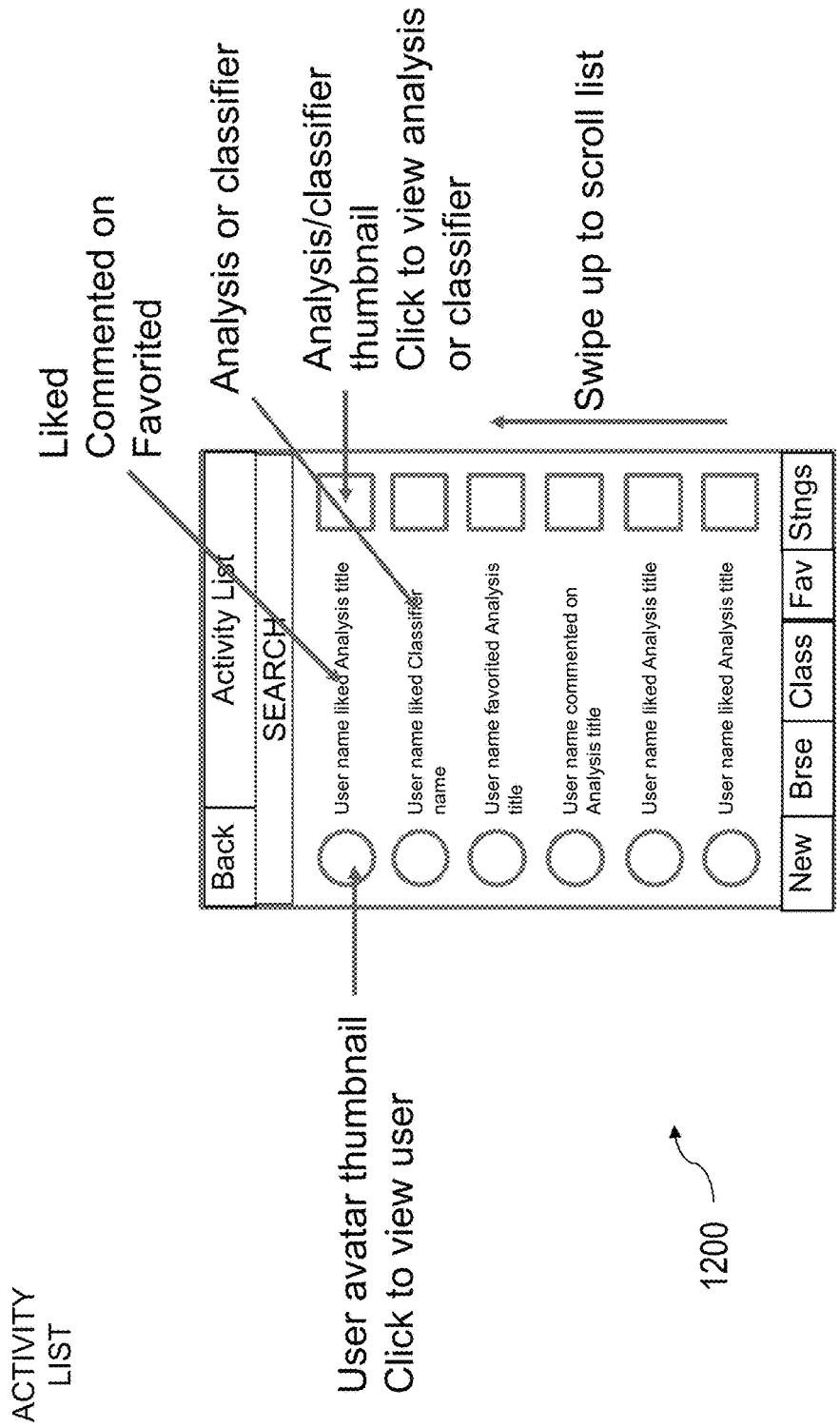
FIG. 12 shows a screenshot illustrating an example of management of an activity list consistent with implementations of the current subject matter.
Figure 13:
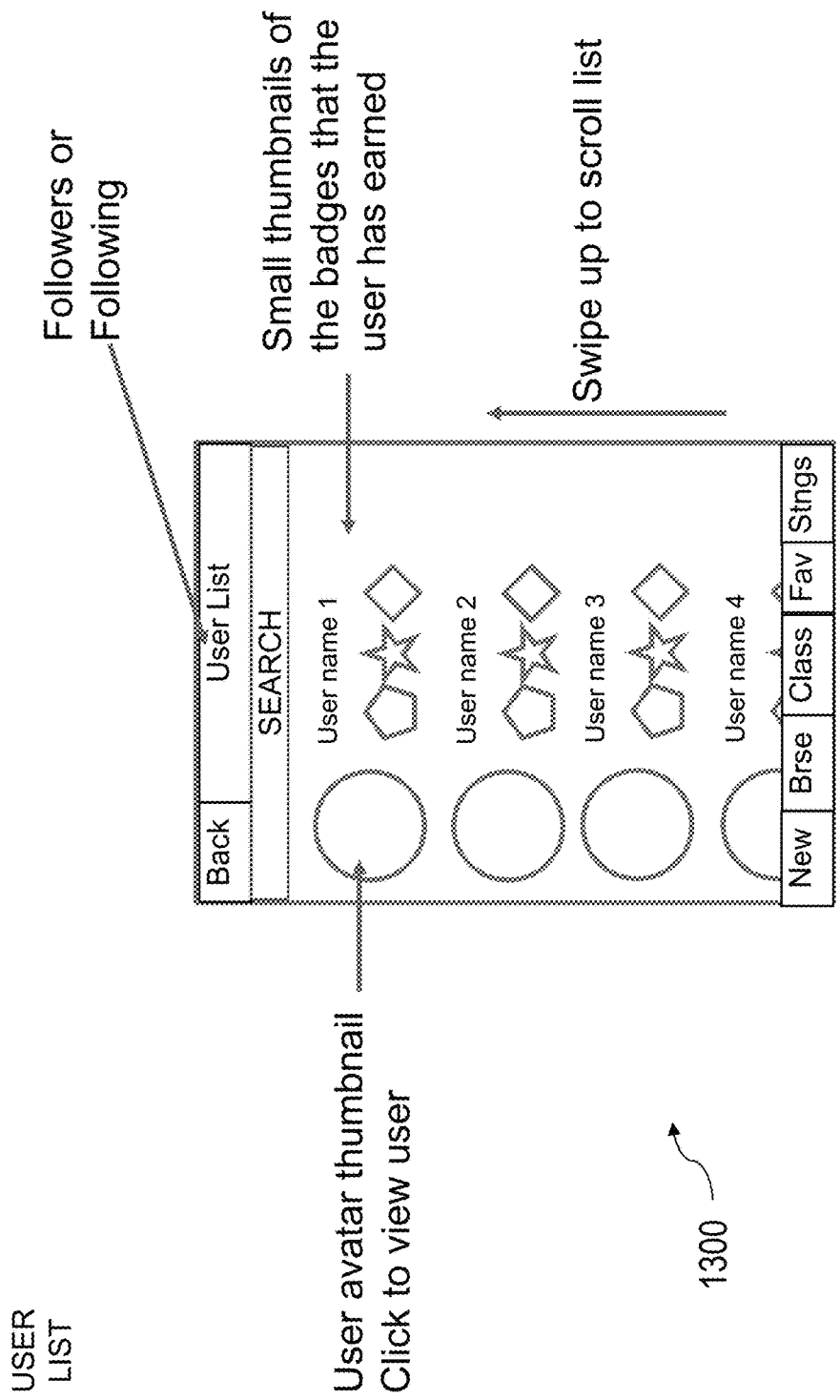
FIG. 13 shows a screenshot illustrating an example of management of a user list consistent with implementations of the current subject matter.

FIG. 12 to FIG. 28 show example screenshots or sequences of screenshots of a mobile application capable of providing one or more of the features discussed herein. For example, the screenshot 1200 of FIG. 12 illustrates management of an activity list, and the screenshot 1300 of FIG. 13 illustrates management of a user list, which can include avatars or profile pictures, badges that a user has earned (e.g. via a gamification scheme or the like), and other information about either other users who follow a user of the application or other users whom the user of the application is following. In all of the screenshots in FIG. 12 through FIG. 28, a menu bar is shown at the bottom of the screen. It will be understood that this feature and others of the user interface are intended to be illustrative and that other user interface configurations are within the scope of the current subject matter. In some implementations of the current subject matter, this menu bar can be consistently displayed (or optionally displayed upon some user input such as a swipe up or a click or tap on a menu bar display icon). The menu bar can include links to functions including one or more of new analysis, browse analyses, protocol creation, favorites, settings, etc.

Figure 14:
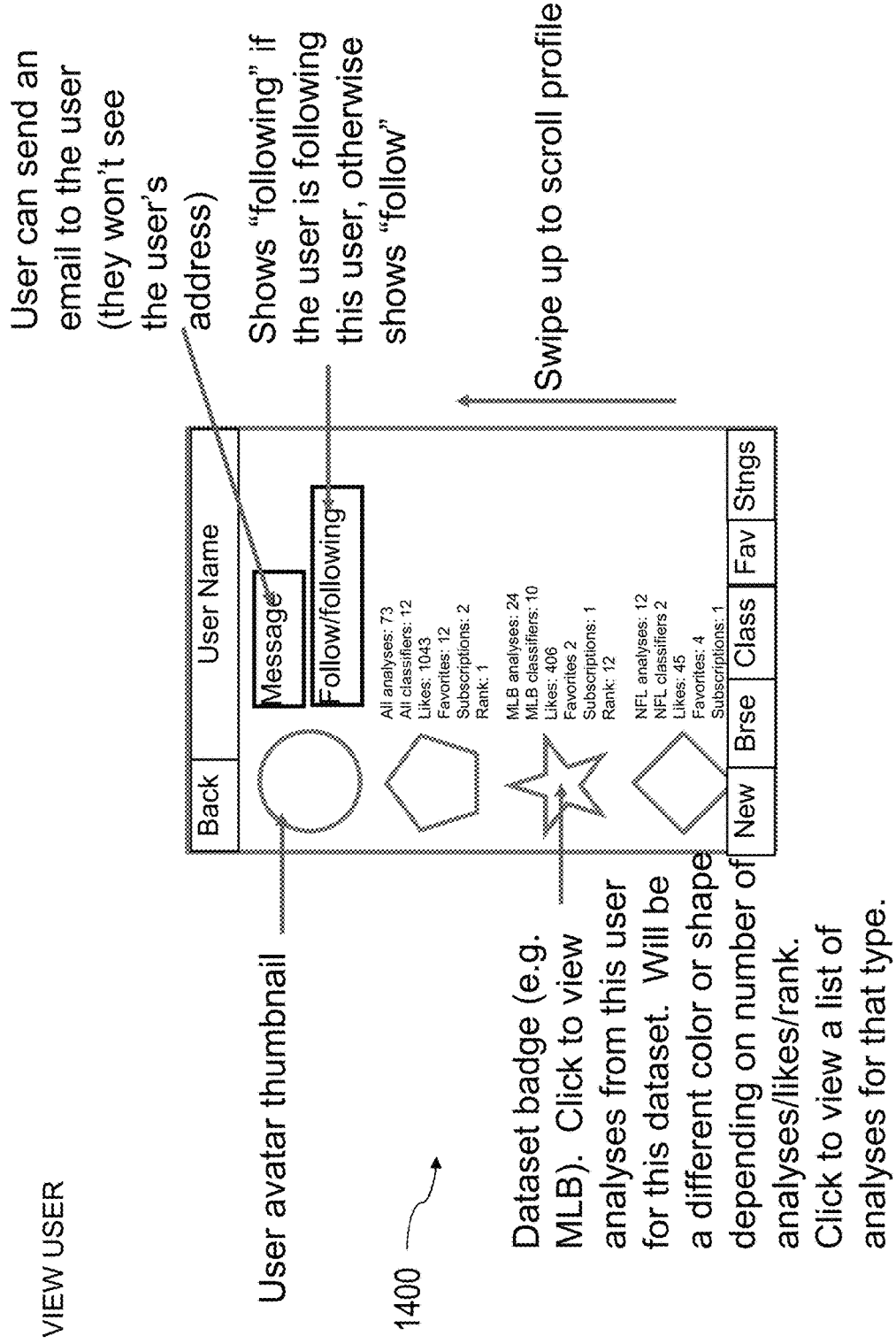
FIG. 14 shows a screenshot illustrating an example of a view of further user details consistent with implementations of the current subject matter.

Selection of a user, for example from the user list in the screenshot 1300 of FIG. 13, can lead to the screenshot 1400 shown in FIG. 14, which can display a view of further user details, such as dataset-specific badges, which can reflect experience, expertise, high ratings, etc. for the selected user based on analyses, protocols, etc. associated with a specific dataset (e.g. baseball player data).

Figure 15:
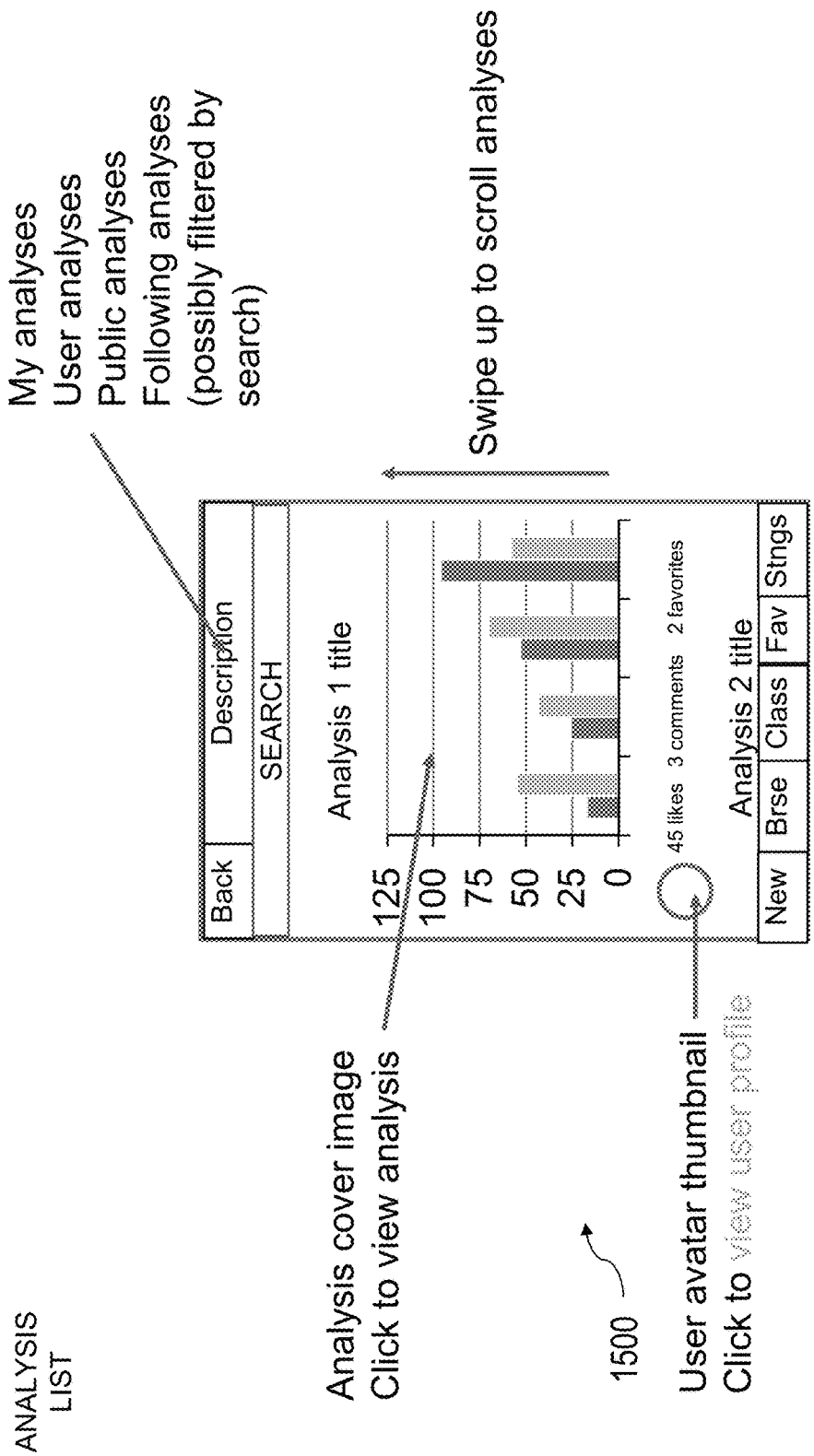
FIG. 15 shows a screenshot illustrating an example of analysis list view consistent with implementations of the current subject matter.
Figure 16:
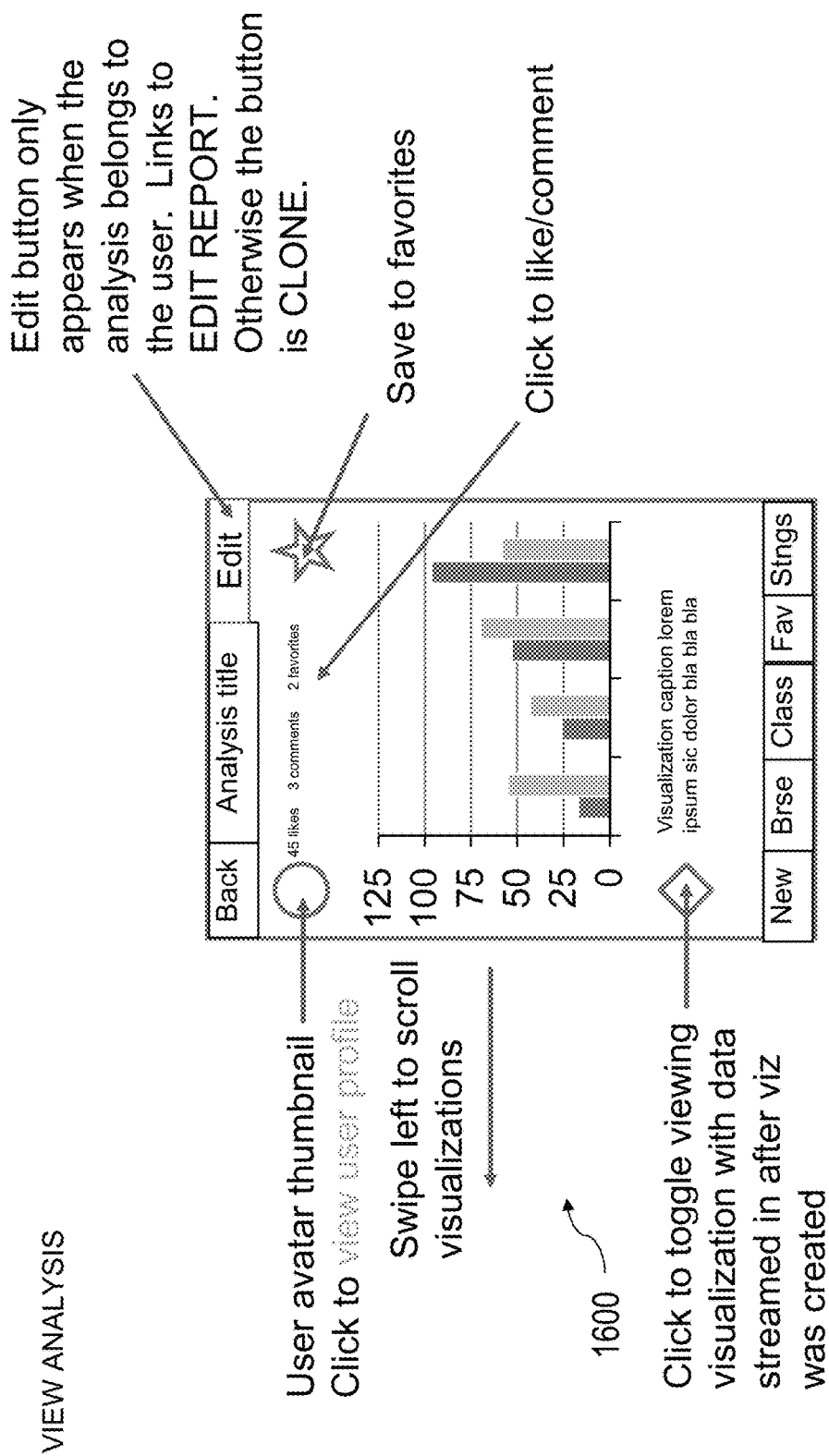
FIG. 16 shows a screenshot illustrating an example of additional functionality relating to visualization consistent with implementations of the current subject matter.

The analysis list view shown in the screenshot 1500 of FIG. 15 can include links (e.g. via an avatar) to the user who created or who owns the analysis as well as a visualization of the analysis. The screenshot 1600 of FIG. 16 includes additional functionality including the ability to toggle viewing of the visualization with data received and applied after creation of the visualization (e.g. to show how a classifier protocol has performed in predictions).

Figure 17:
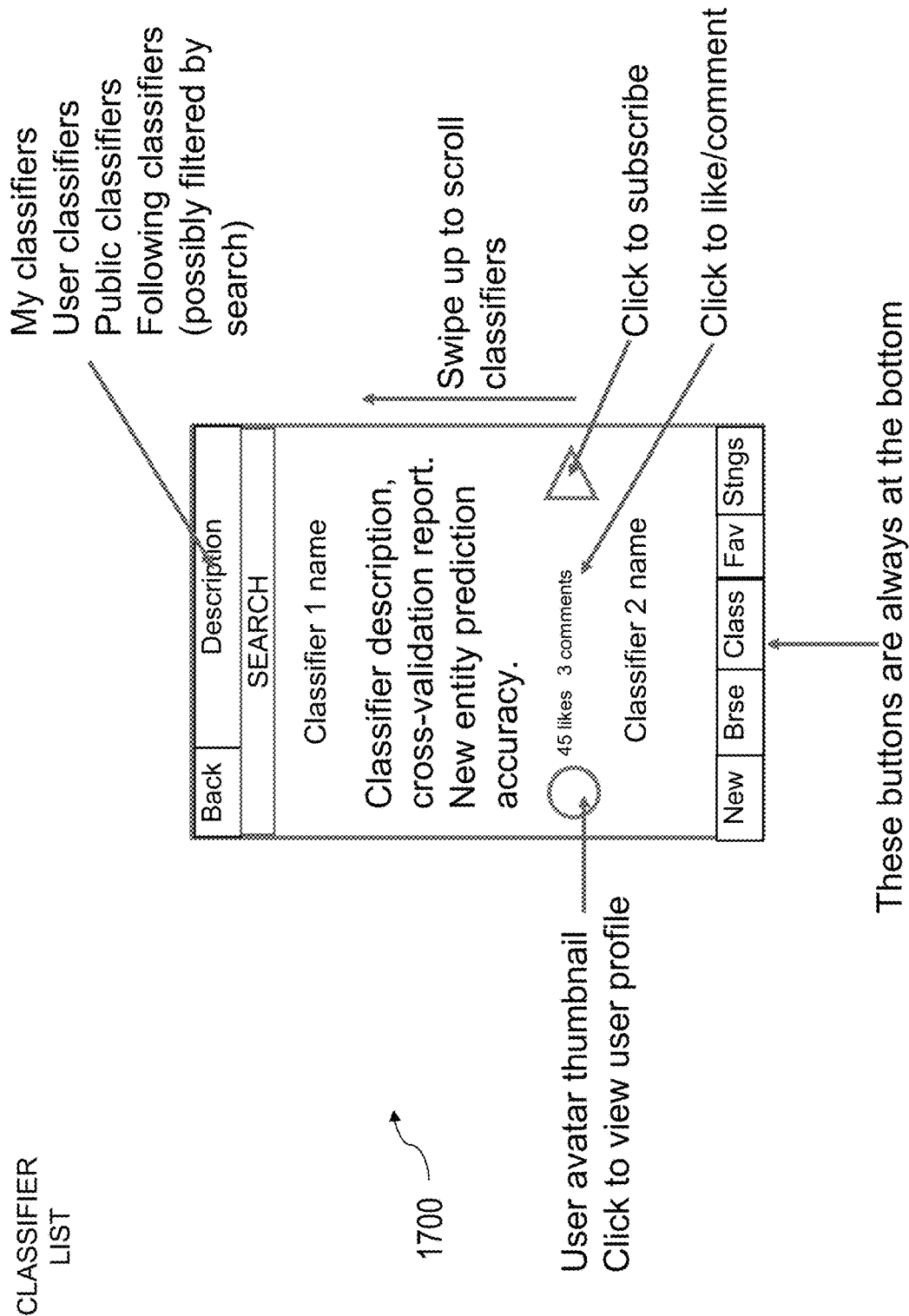
FIG. 17 shows a screenshot illustrating an example of a protocol list view consistent with implementations of the current subject matter.

A protocol list view is shown in the screenshot 1700 of FIG. 17. Here, a protocol name, description, etc. as well as user information for a creator/owner of the protocol can be shown as well as UI controls for other relevant functions.

Figure 18:
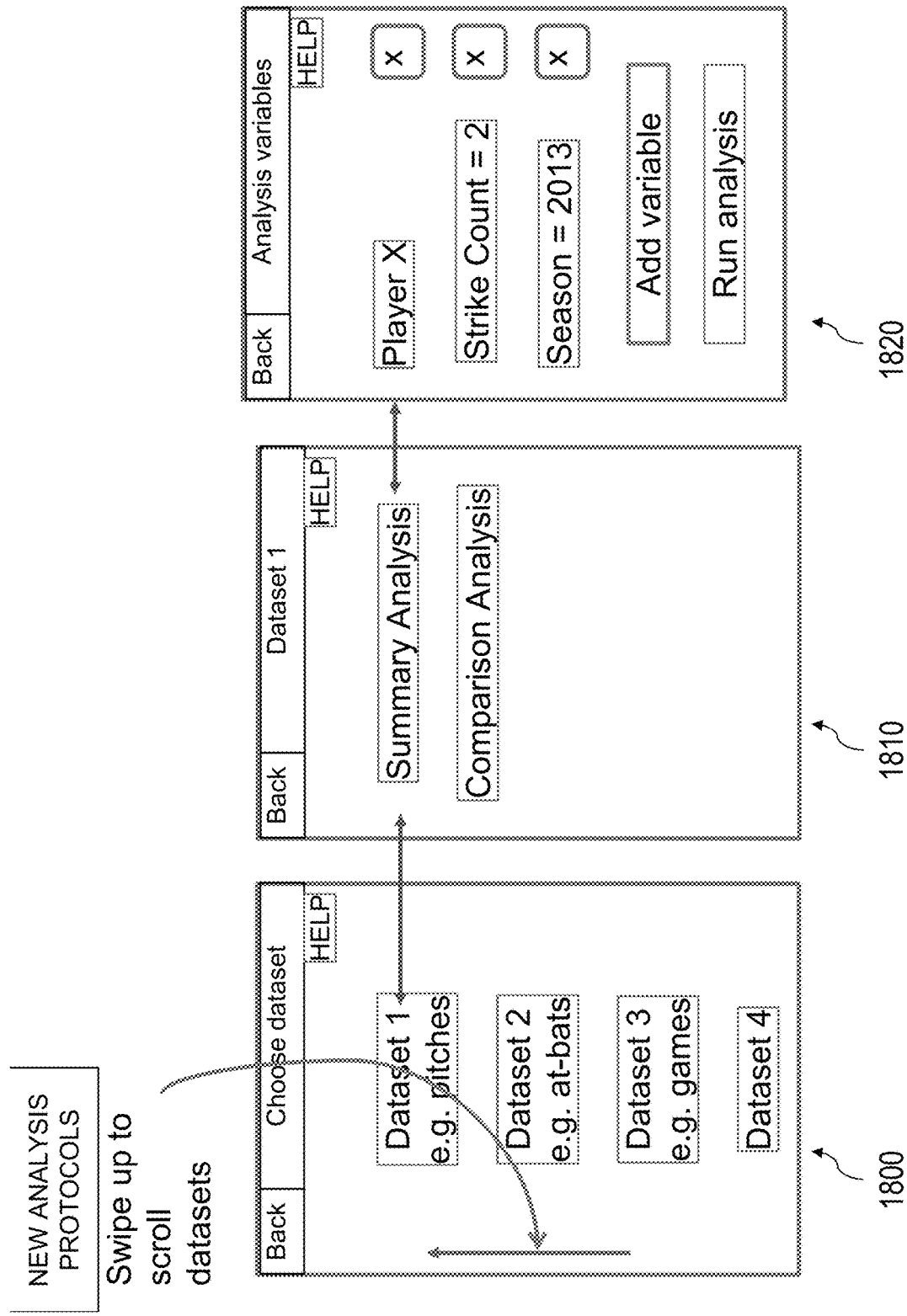
FIG. 18 show screenshots illustrating an example of new analysis creation functions consistent with implementations of the current subject matter.

The screenshots 1800, 1810, 1820 of FIG. 18 illustrate views relating to new analysis creation functions. In the first screenshot 1800, a user can select one or more datasets, and based on the selection can then choose whether to complete a summary analysis or a comparison analysis. Selection of summary analysis in a second screenshot 1820 can lead to a third screenshot 1820 enabling variable selection. In this example, the variables to be selected relate to players, strike counts, season, etc. It will be understood that any type of variable relevant to a dataset can be selected.

Figure 19:
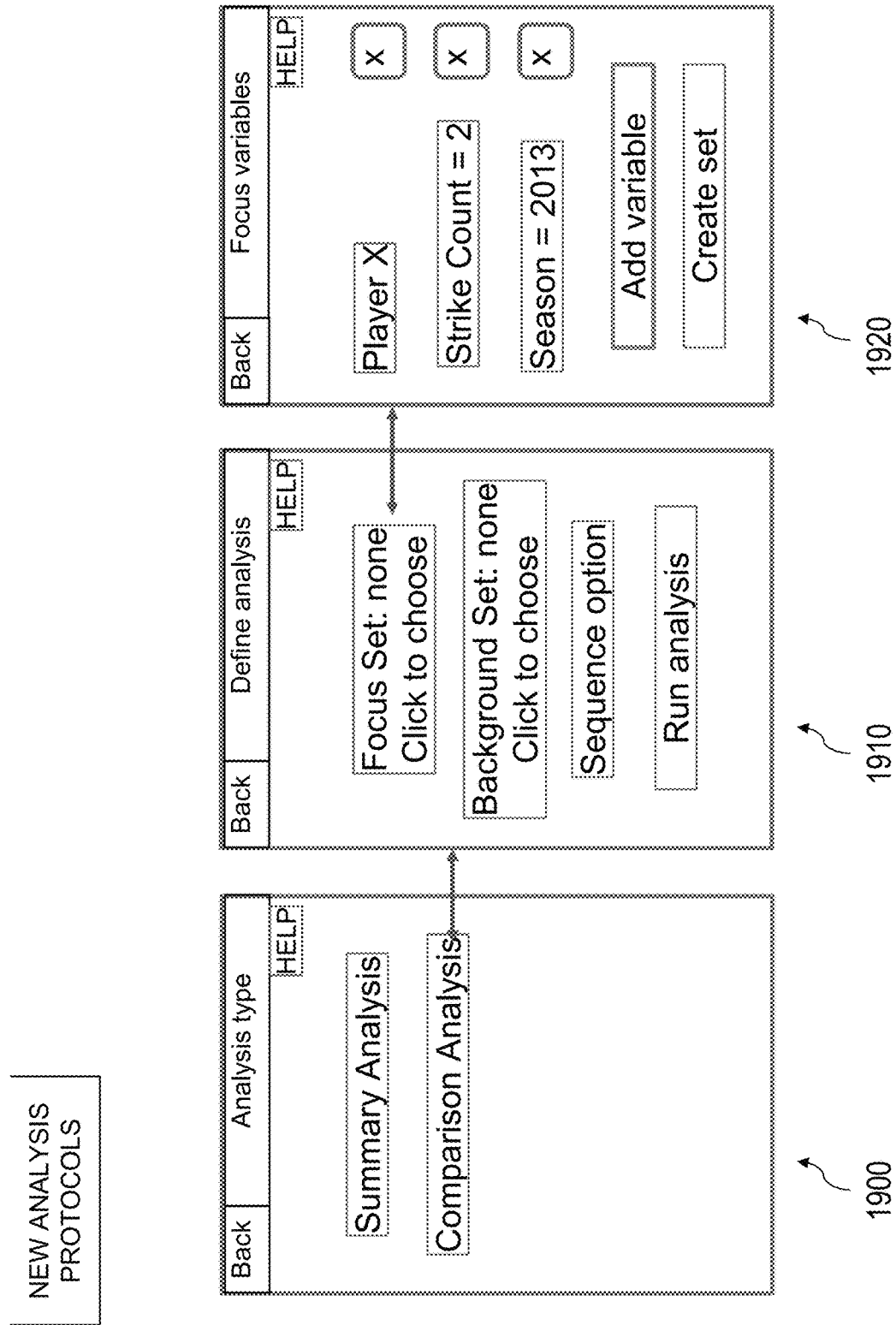
FIG. 19 show screenshots illustrating an example of selection of a comparison analysis consistent with implementations of the current subject matter.

FIG. 19 shows screenshot views 1900, 1910, 1920 relating to selection of a comparison analysis, which then prompts the user to select a background set and a focus set as well as sequence options as shown in the second screenshot 1910. A focus variable can be selected in a third screenshot 1920.

Figure 20:
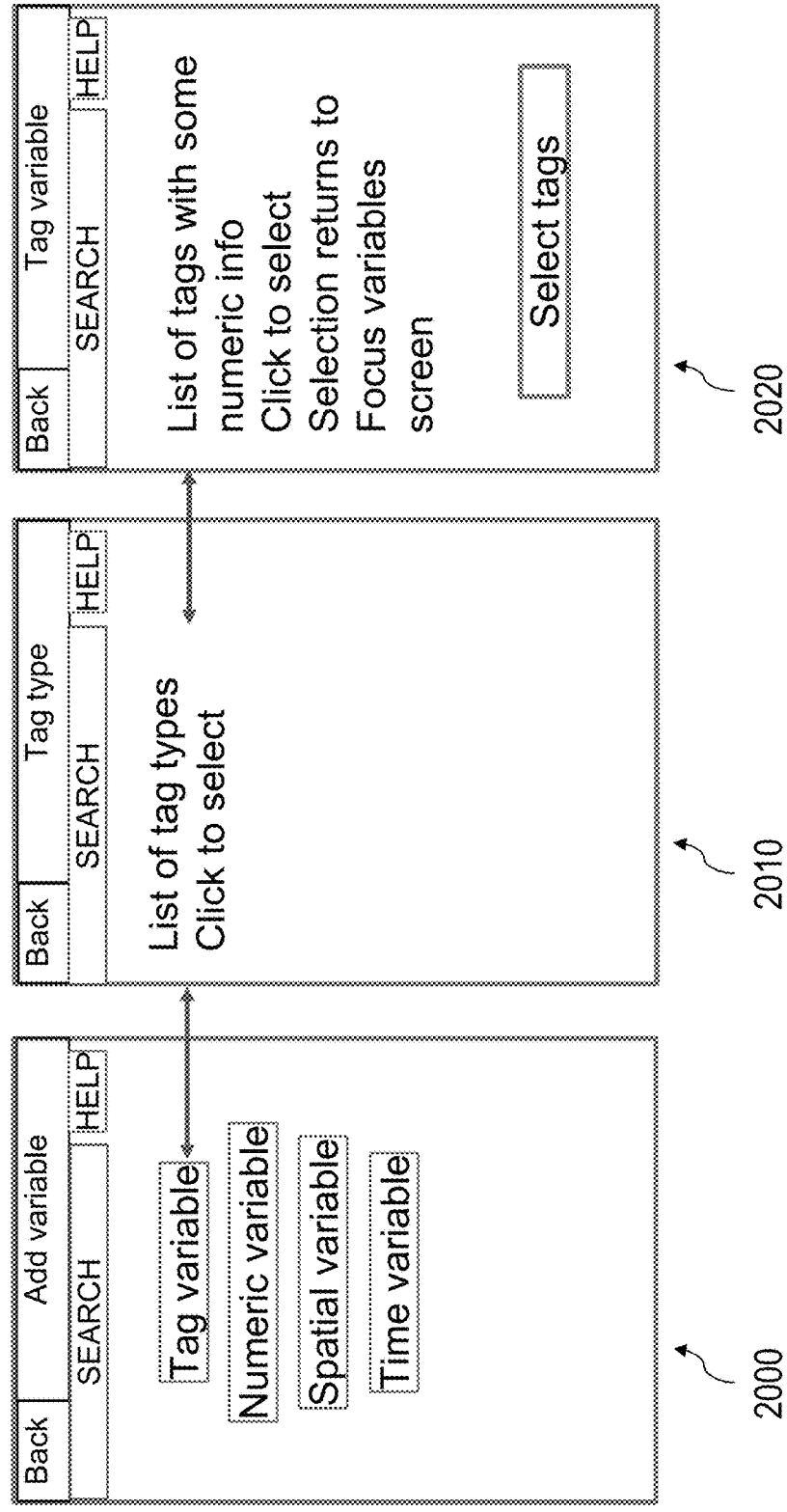
FIG. 20 show screenshots illustrating an example of variable selections, additions, and tagging consistent with implementations of the current subject matter.
Figure 21:
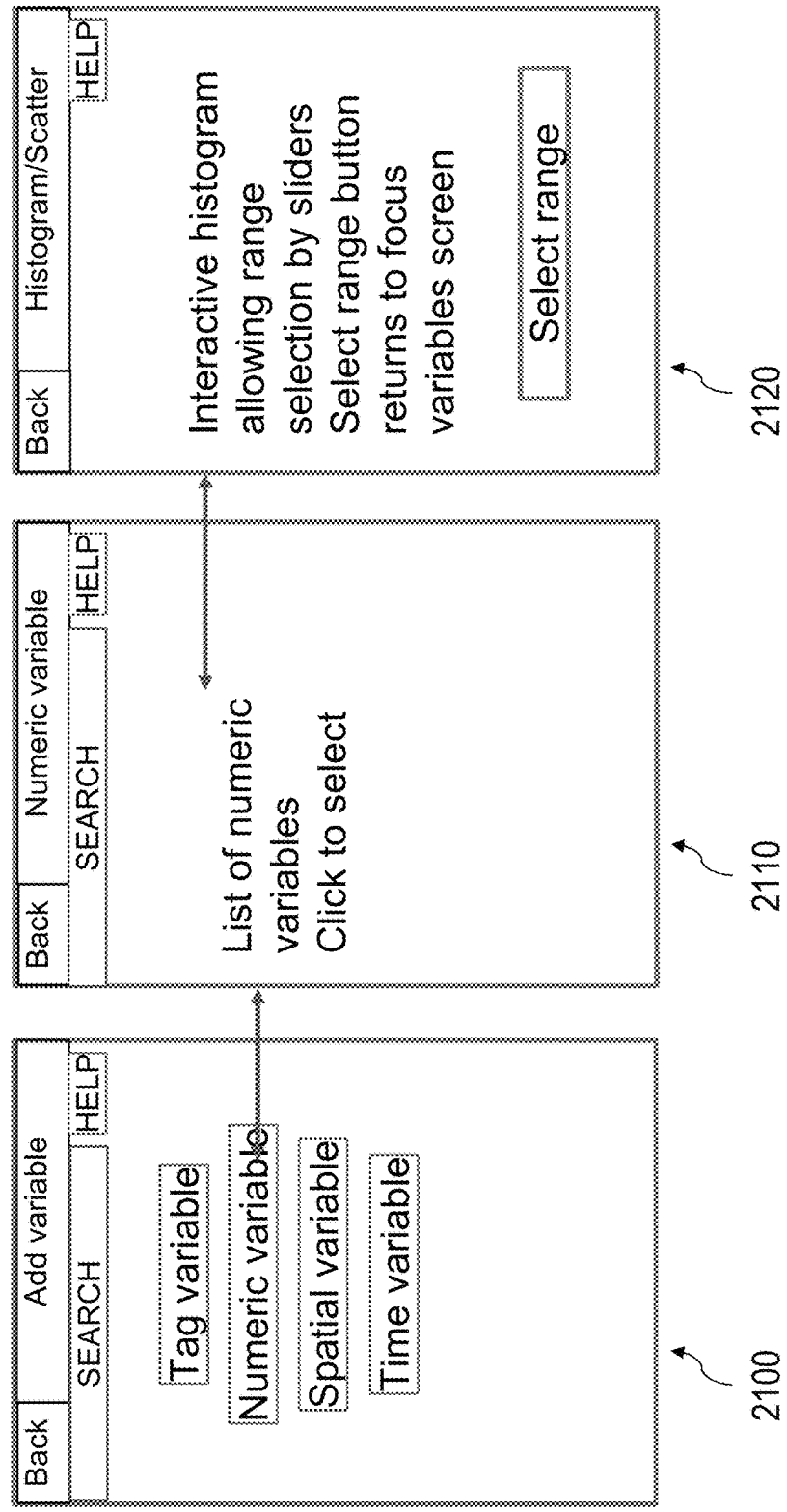
FIG. 21 show screenshots illustrating an example of variable selections, additions, and tagging consistent with implementations of the current subject matter.

FIG. 20 and FIG. 21 respectively show screenshots 2000, 2010, 2020 and 2100, 2110, 2120 relating to variable selections, additions, and tagging. The rightmost screenshot 2110 in FIG. 21 can display an interactive histogram or other visualization that can allow range selection of numeric variables by sliders that allow the user to easily choose ranges for the various variables to be included in the analysis.

Figure 22:
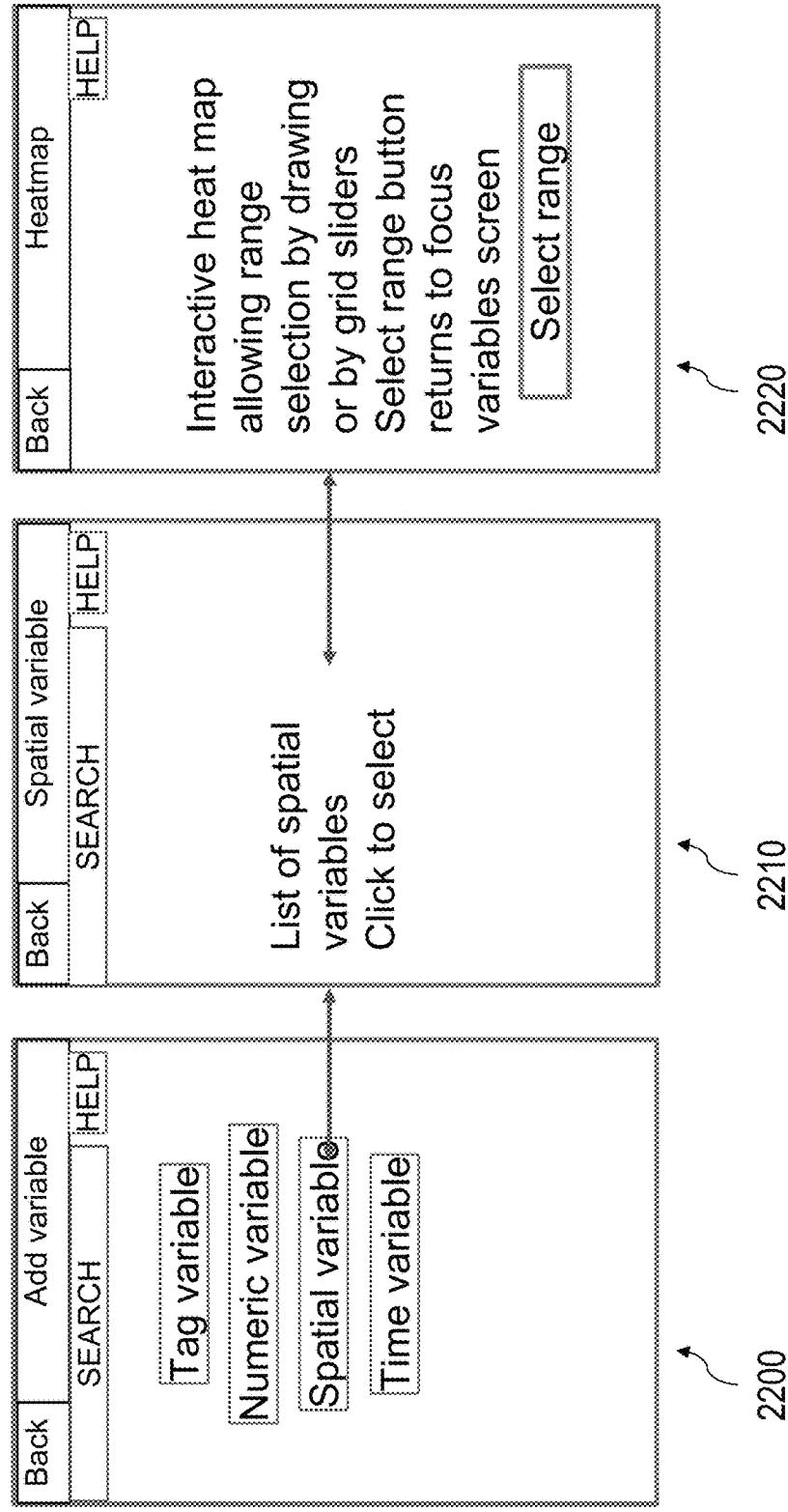
FIG. 22 show screenshots illustrating an example of spatial variable addition consistent with implementations of the current subject matter.
Figure 23:
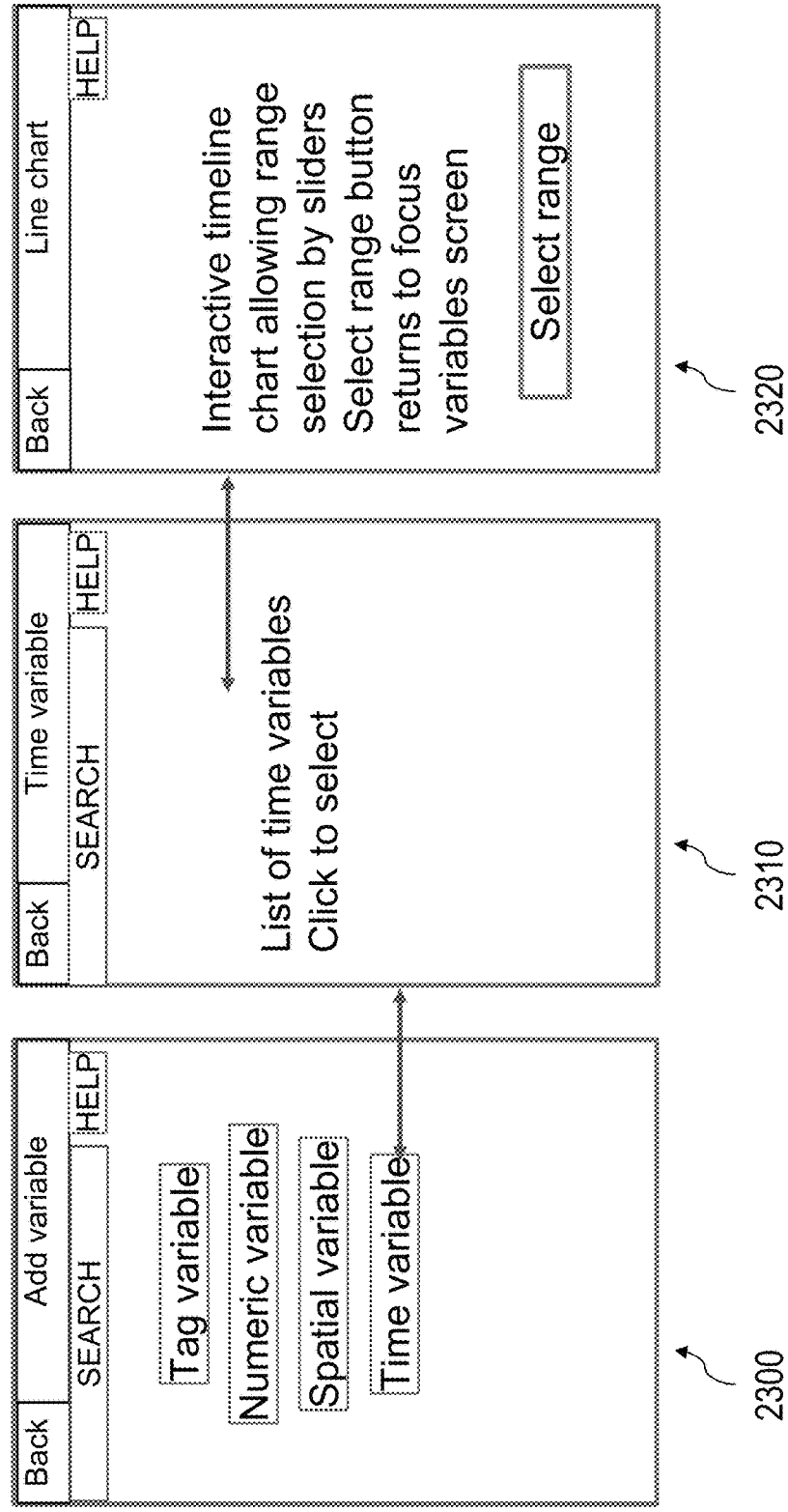
FIG. 23 show screenshots illustrating an example of time variable addition consistent with implementations of the current subject matter.

FIG. 22 shows screenshots 2200, 2210, 2220 relating to spatial variable addition, including use of interactive heat maps for use in selecting relevant ranges of spatial variables, and FIG. 23 shows screenshots 2300, 2310, 2320 relating to time variable addition, including use of interactive timeline charts for use in selecting relevant ranges of time variables.

Figure 24:
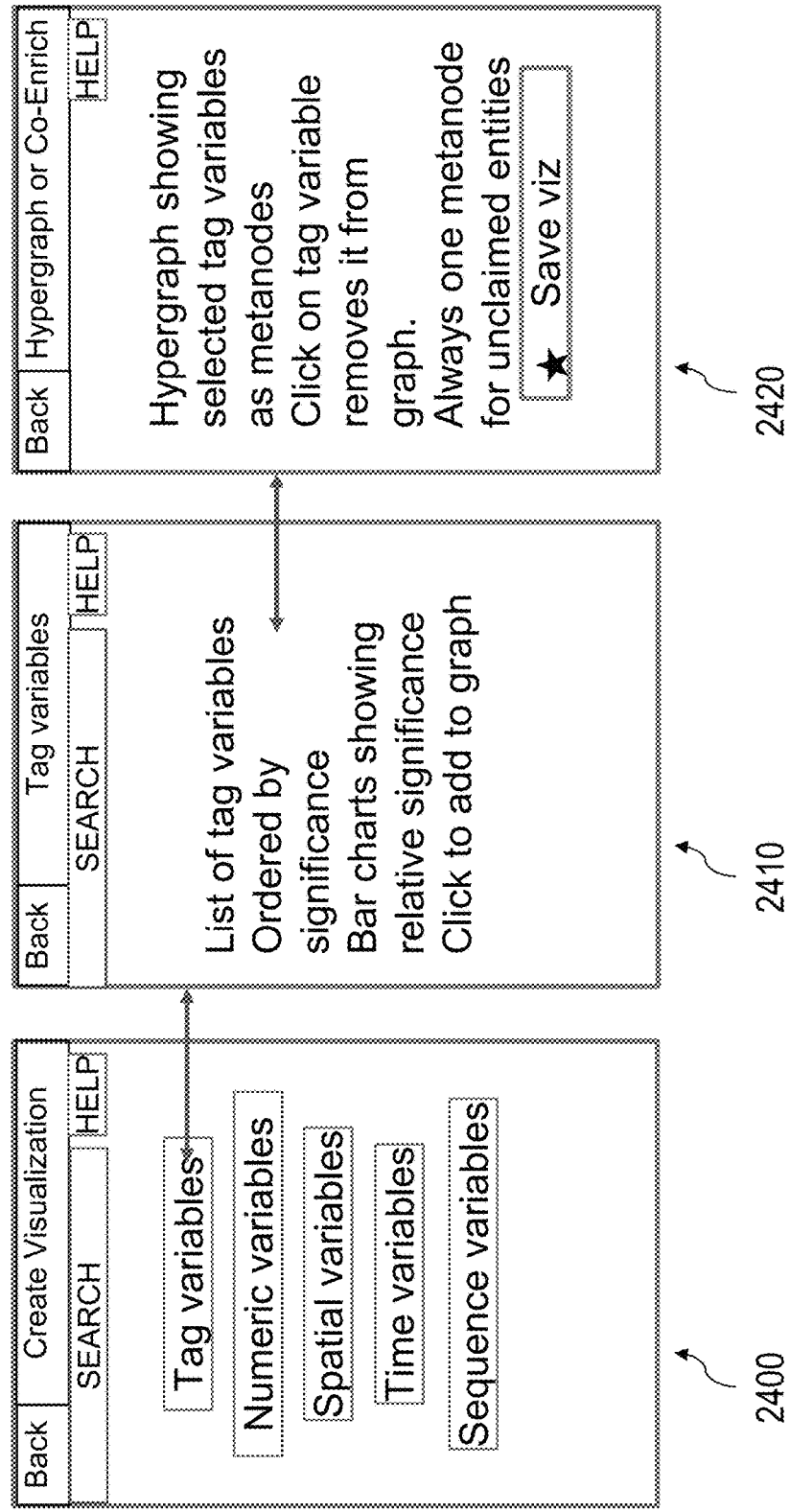
FIG. 24 show screenshots illustrating an example of selection of tag variables and display of hypergraphs illustrating the selected tag variables as metanodes consistent with implementations of the current subject matter.

FIG. 24 through FIG. 28 show screenshots relating to visualization creation, which can include selection of variables to be tagged and display of a hypergraph showing selected tag variables as metanodes. For example, the screenshots 2400, 2410, 2420 of FIG. 24 show features relating to selection of tag variables and display of hypergraphs illustrating the selected tag variables as metanodes. Clicking on a tag variable removes it from the hypergraph.

Figure 25:
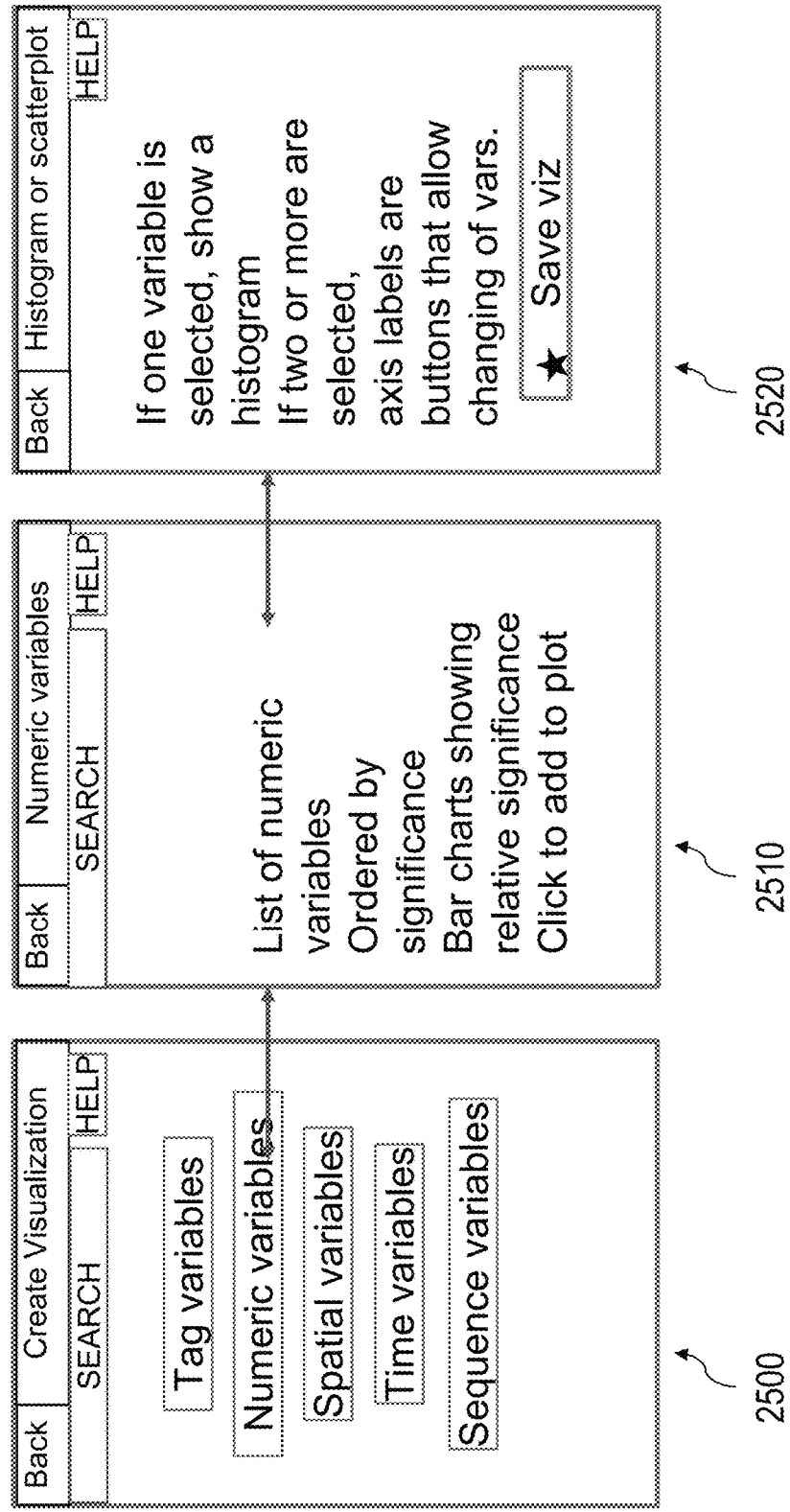
FIG. 25 show screenshots illustrating an example of visualization creation for numeric variables consistent with implementations of the current subject matter.
Figure 26:
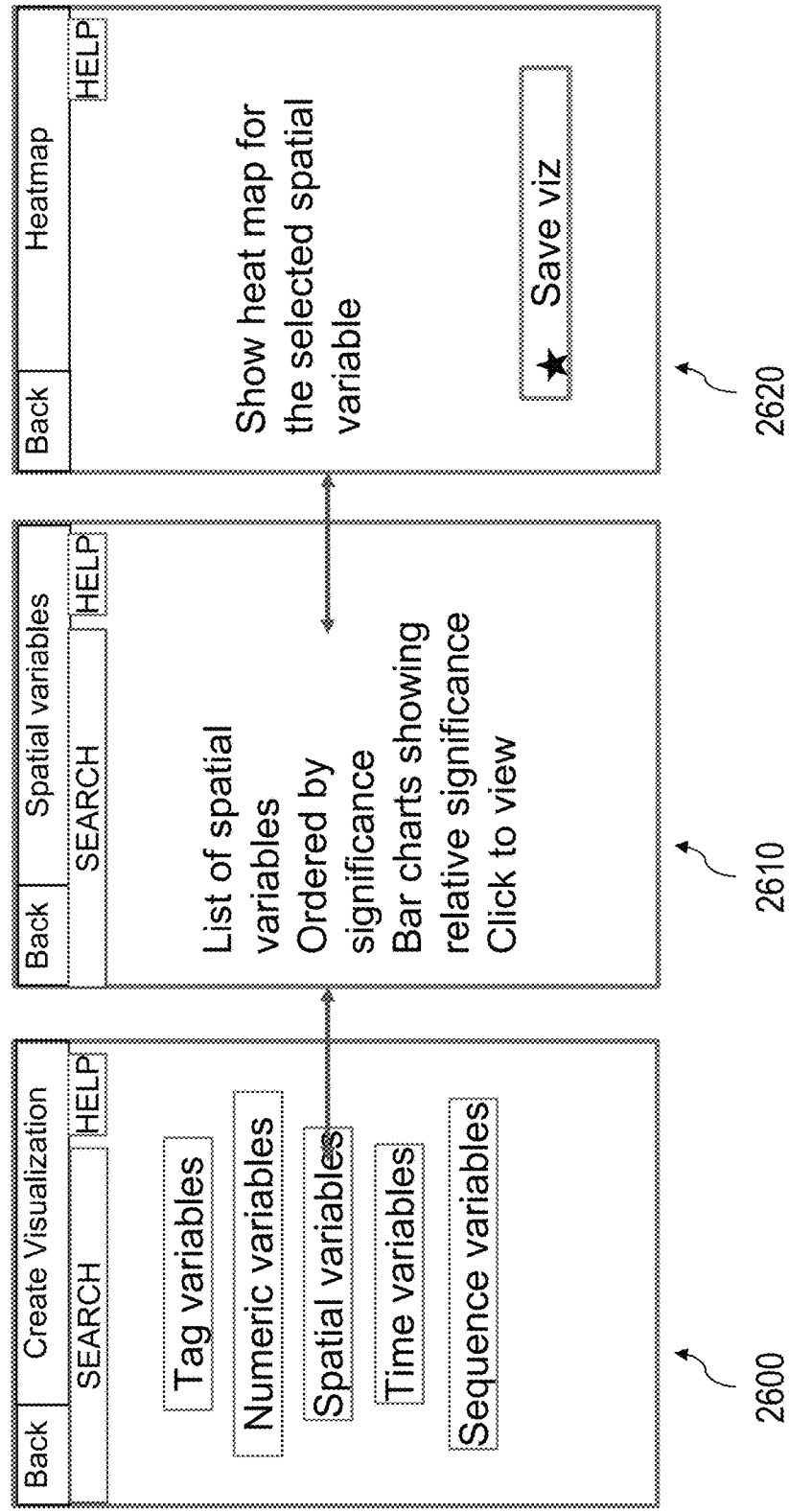
FIG. 26 show screenshots illustrating an example of visualization creation for spatial variables consistent with implementations of the current subject matter.
Figure 27:
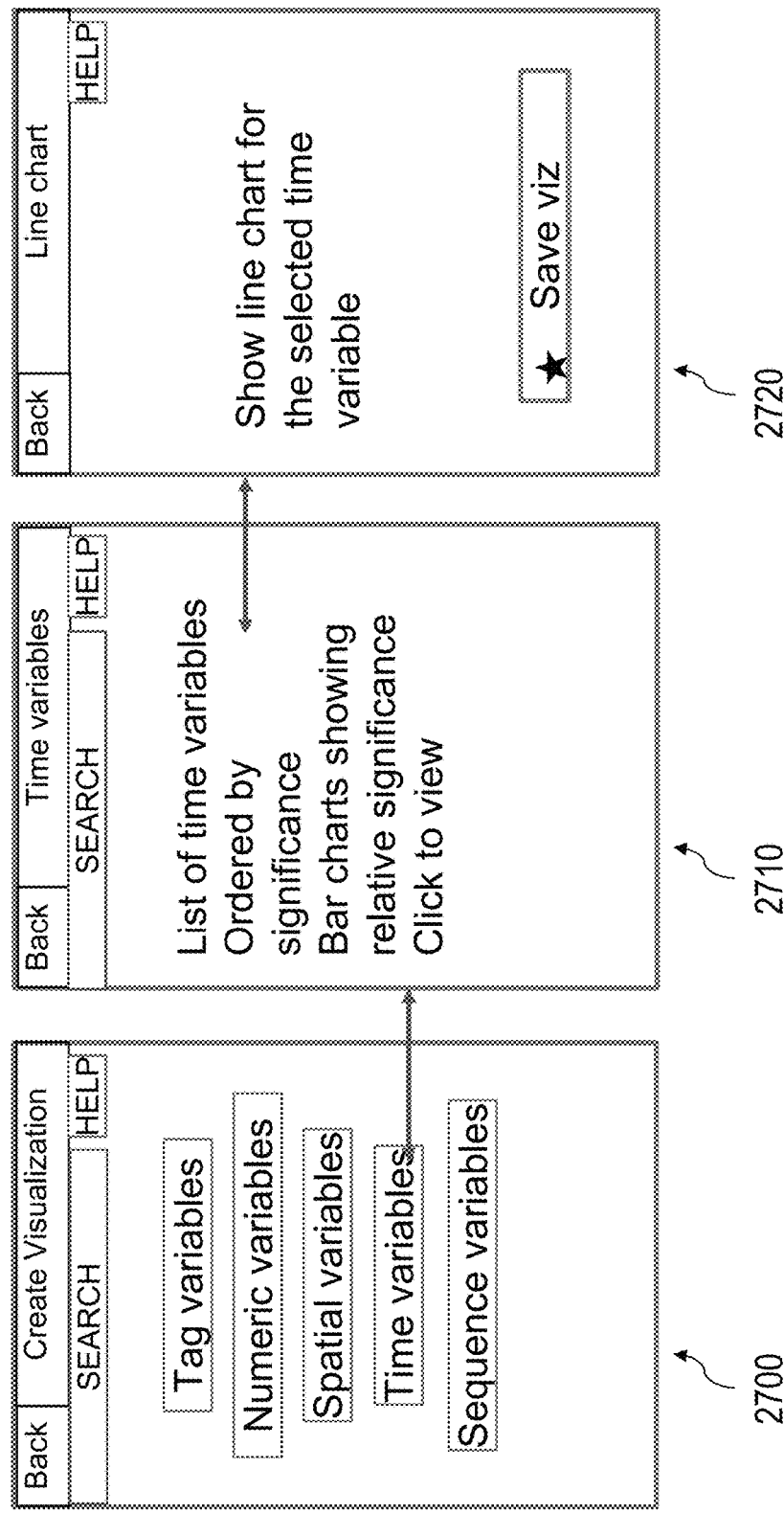
FIG. 27 show screenshots illustrating an example of visualization creation for time variables consistent with implementations of the current subject matter.
Figure 28:
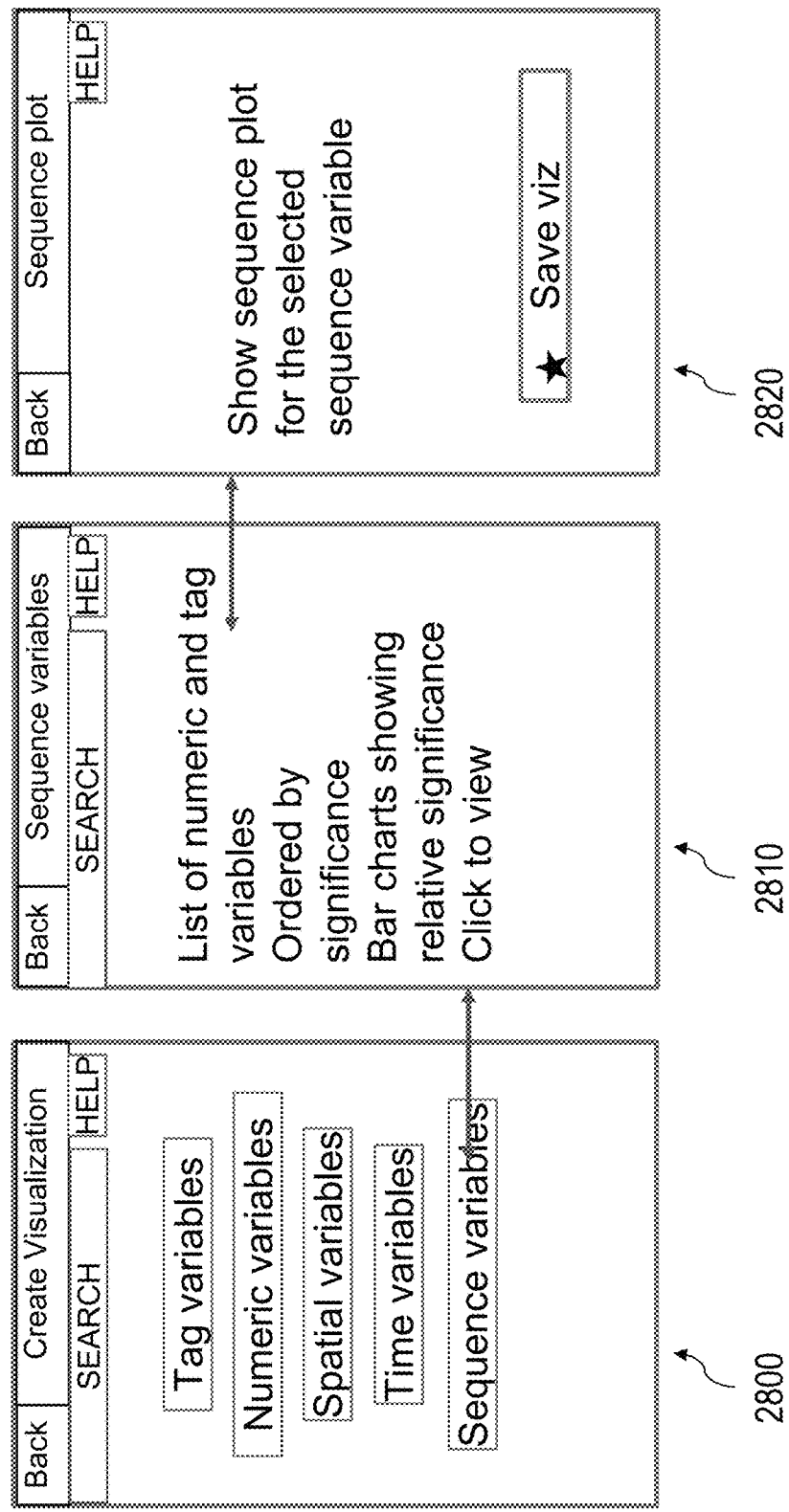
FIG. 28 show screenshots illustrating an example of visualization creation for sequence variables consistent with implementations of the current subject matter.
Figure 40:
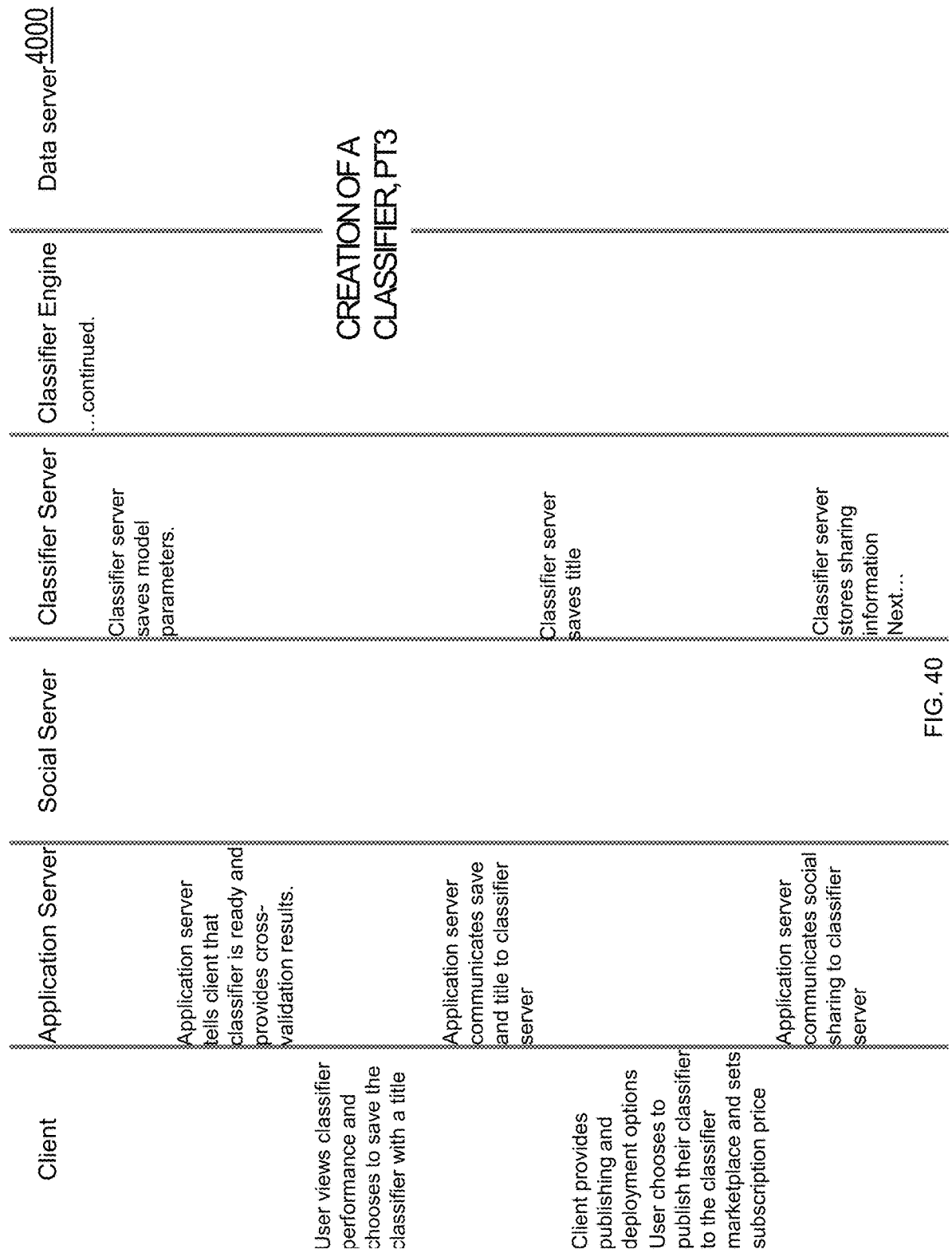
Figure 41:
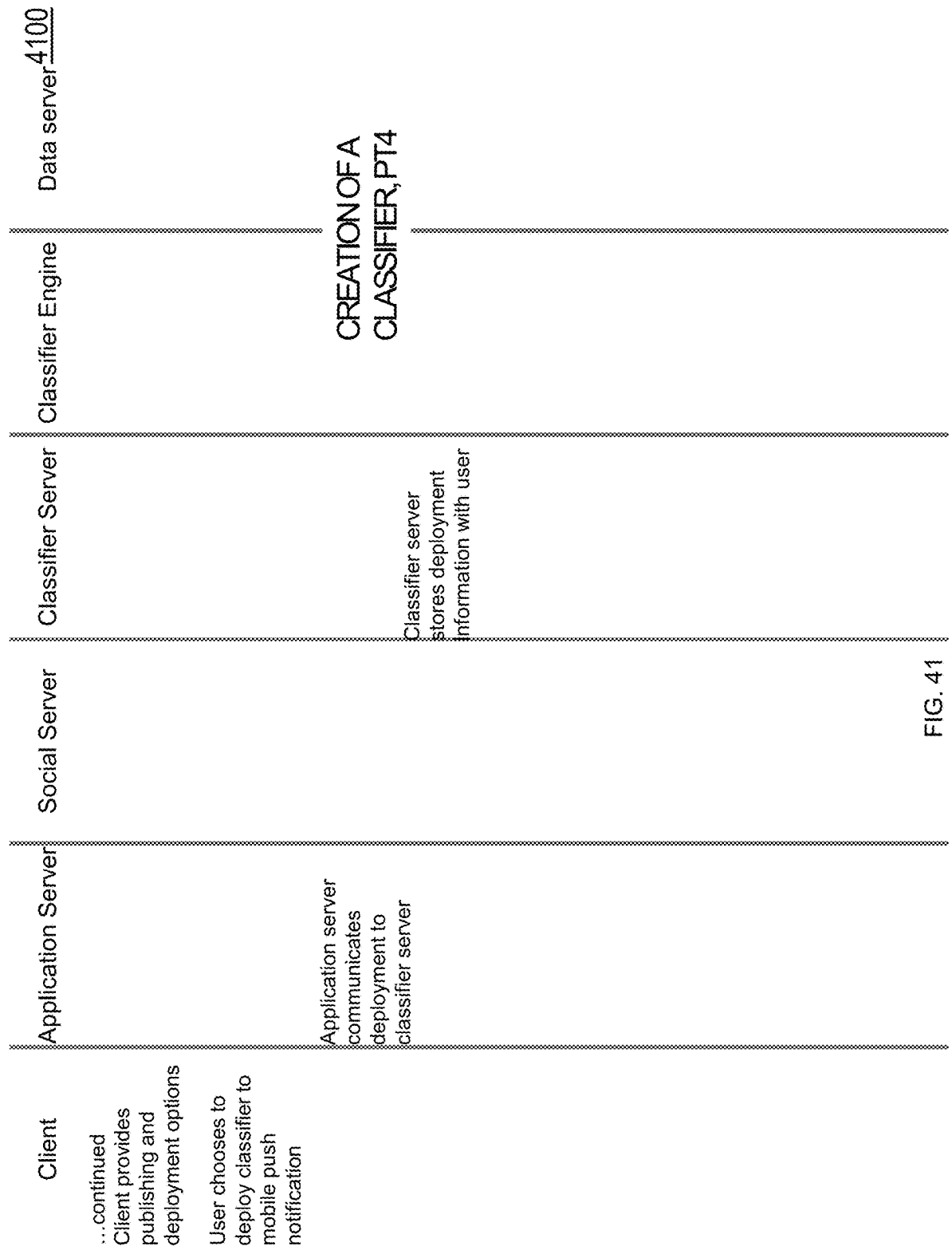

FIG. 25 shows screenshots 2500, 2510, 2520 relating to visualization creation for numeric variables, which can be shown as a list of numeric variables ordered by significance, optionally with bar charts (and/or other graphical representations) showing relative significance. Histograms or scatterplots can be shown for the selected spatial variable(s). FIG. 26 shows screenshots 2600, 2610, 2620 relating to visualization creation for spatial variables, which can be shown as a list of spatial variables ordered by significance, optionally with bar charts (and/or other graphical representations) showing relative significance. A heat map can be shown for the selected spatial variable. FIG. 27 shows screenshots 2700, 2710, 2720 relating to visualization creation for time variables, which can be shown as a list of spatial variables ordered by significance, optionally with bar charts (or other graphical representations) showing relative significance. A line chart can be shown for the selected time variable. FIG. 28 shows screenshots 2800, 2810, 2820 relating to visualization creation for sequence variables, which can be shown as a list of numeric and tag variables ordered by significance, optionally with bar charts (and/or other graphical representations) showing relative significance. A sequence plot can be shown for the selected sequence variable.

FIG. 29 through FIG. 46 show a series of example process flow descriptions for various functionality described herein. It will be understood by one of ordinary skill in the art that the various operations can be performed in different location or by different computational entities than those described and/or by more or fewer discrete modules or programmatic divisions than those described. Additionally, while the examples are discussed in terms of data relating to professional baseball games and players, it will be well understood that the data analysis tools described herein are applicable to a wide range of applications, including but not limited to financial data, business or enterprise data, investment data, health care or medical data, other sports data, or the like. In the flow descriptions spanning more than one figure, it will be understood that the columns corresponding to each programmatic or computational entity continue in sequence through the series of figures.

The example process flow description segments 2900, 3000, 3100, 3200, 3300 of FIG. 29 though FIG. 33 show aspects of the functional flow for creation of a new analysis and social sharing of the resulting new analysis. The entities involved in this example are listed along the top of the columns, and can be as described above. The example process flow description segments 3400, 3500, 3600, 3700 of FIG. 34 through FIG. 37 show aspects of the functional flow for analysis discovery and social feedback. The example process flow description segments 3800, 3900, 4000, 4100 of FIG. 38 through FIG. 41 show aspects of the functional flow for creation of a protocol. The example process flow description segments 4200, 4300, 4400 of FIG. 42 through FIG. 44 show aspects of the functional flow for protocol discovery and subscription. The example process flow description segment 4500 of FIG. 45 shows aspects of the functional flow for making a prediction with a classifier protocol daemon, and the example process flow description segment 4600 of FIG. 46 shows aspects of the functional flow for making a recording performance of a classifier protocol post-validation with a classifier protocol daemon.

The appendices attached and incorporated by reference into the provisional application to which this application claims priority include additional information relating to example implementations of the approaches described herein. In the example implementations shown and explained in Appendix A, the analysis, visualization, protocols, etc. approaches are applied to data relating to professional baseball players and professional football players.

Appendix B illustrates aspects of an example implementation of the current subject matter in which events sequences are associated with outcomes. In the example shown, a soccer match between the San Jose Earthquakes™ and the Los Angeles Galaxy™ of Major League Soccer™ on Jun. 29, 2013 is analyzed. The match included five goals scored, two by the Galaxy and three by the Earthquakes. For each goal scored, Appendix B includes a sequence diagram showing events that preceded the goal. Appendix B also shows some aspects of a hyper-geometric enrichment analysis that can be performed on the data consistent with implementations of the current subject matter. In effect, the analysis looks for places where the overlap between specific types of events (in this case, all events involving the player Landon Donovan and all events occurring within 5 events before a goal scored by his team) is greater than what would be statistically expected if the events were randomly distributed. A player having a greater overlap than expected between these two subsets of the data would be said to have an enrichment effect, in this case an "enrichment in goals-for." Similarly, an enrichment in goals against could be measured for higher than statistically expected overlap between player events and events preceding a goal scored by the other team.

It will be readily understood that the features and functionality discussed in the appendices are not intended to be limiting but merely illustrative of possible implementations of the current subject matter.

FIG. 47 shows a process flow chart relating to a method consistent with at least one implementation of the current subject matter. At 4702, a user accesses a dataset (e.g. a private data set, a public data set, or a combination thereof) via a data analysis application. The application supports selection of one or more subsets of data from within the dataset at 4704. A single subset can be selected for a summary analysis while multiple subsets (e.g. a background subset and a focus subset) can be chosen for a comparison analysis. User interaction with the application user interface can allow selection of variables and ranges for the variables based on visual displays of the effects on the range choices at 4706. Analysis content can be generated directly from within the application user interface at 4710, for example without requiring the user to understand the underlying data analysis algorithms. At 4712, the resulting analysis content can optionally be shared with other users, for example via a social networking feature that is integrated into the application user interface and that can include subscription features following, like/dislike tagging, etc. and can also integrate an analysis content marketplace.

In some examples, the analysis content can include predictive models, for example the protocols discussed above. In other examples, the application can support creation of new server/upload of data via API functionality for one or more user-specified datasets, which can be any kind of dataset (e.g. enterprise/private, public, or combinations thereof).

Implementations of the current subject matter can include, but are not limited to, methods consistent with the descriptions provided above as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The accompanying drawings and appendices, which are incorporated in and constitute a part of this specification, show certain aspects of the subject matter disclosed herein and, together with the description, help explain some of the principles associated with the disclosed implementations.

What is claimed is:

1. A method comprising:
   providing access to a dataset via a data analysis application;
   receiving, by the data analysis application, selection of one or more subsets of data from within the dataset;
   allowing selection of variables and ranges for the variables based on visual displays of the effects on range choices, the allowing occurring via a user interface of the data analysis application;
   generating analysis content directly from within the application user interface without requiring input of underlying data analysis algorithms;
   providing an integrated social network via which a user of the data analysis application shares the generated analysis content with another user; and
   offering, via the social network, a subscription to the generated analysis content, wherein the generated analysis content offered by the subscription via the social network comprises a classifier protocol via which a subscribing user can receive predictions based on a predictive model, and wherein the integrated social network comprises subscription features for at least one of: following the generated analysis content, tagging the generated analysis content with a like tag, and tagging the generated analysis content with a dislike tag.

2. The method as in claim 1, wherein the receiving selection of the one or more subsets of data from within the dataset comprises receiving a definition of a background data set and a focus set.

3. The method as in claim 2, wherein the focus set comprises a subset of the background data set and the background data set comprises a set of entities selected from within at least one database upon which the data analysis application is configured to operate.

4. The method as in claim 2, wherein the selection of variables and ranges for the variables comprises defining a classifier protocol based on user input comprising selection of one or more predictive criteria.

5. The method as in claim 4, wherein the classifier protocol comprises a predictive model and a user-defined threshold, and wherein the method comprises providing a notification to a user of the data analysis application and/or another user of the classifier protocol based on a prediction generated by the predictive model constrained by the background data set, the focus set, and the one or more predictive criteria.

6. The method as in claim 1, wherein the generated analysis content further comprises one or more predictive criteria, a background data set, and a focus set defined by a user of the data analysis application for the classifier protocol.

7. A computer program product comprising a machine-readable medium storing instructions that, when executed by at least one programmable processor, cause the at least one programmable processor to perform operations comprising:
   providing access to a dataset via a data analysis application;
   receiving, by the data analysis application, selection of one or more subsets of data from within the dataset;
   allowing selection of variables and ranges for the variables based on visual displays of the effects on range choices, the allowing occurring via a user interface of the data analysis application;
   generating analysis content directly from within the application user interface without requiring input of underlying data analysis algorithms;
   providing an integrated social network via which a user of the data analysis application shares the generated analysis content with another user; and
   offering, via the social network, a subscription to the generated analysis content, wherein the generated analysis content offered by the subscription via the social network comprises a classifier protocol via which a subscribing user can receive predictions based on a predictive model, and wherein the integrated social network comprises subscription features for at least one of: following the generated analysis content, tagging the generated analysis content with a like tag, and tagging the generated analysis content with a dislike tag.

8. The computer program product as in claim 7, wherein the receiving selection of the one or more subsets of data from within the dataset comprises receiving a definition of a background data set and a focus set.

9. The computer program product as in claim 8, wherein the focus set comprises a subset of the background data set and the background data set comprises a set of entities selected from within at least one database upon which the data analysis application is configured to operate.

10. The computer program product as in claim 8, wherein the selection of variables and ranges for the variables comprises defining a classifier protocol based on user input comprising selection of one or more predictive criteria.

11. The computer program product as in claim 10, wherein the classifier protocol comprises a predictive model and a user-defined threshold, and wherein the method comprises providing a notification to a user of the data analysis application and/or another user of the classifier protocol based on a prediction generated by the predictive model constrained by the background data set, the focus set, and the one or more predictive criteria.

12. The computer program product as in claim 7, wherein the generated analysis content further comprises one or more predictive criteria, a background data set, and a focus set defined by a user of the data analysis application for the classifier protocol.

13. A system comprising:
computer hardware configured to perform operations comprising:
providing access to a dataset via a data analysis application;
receiving, by the data analysis application, selection of one or more subsets of data from within the dataset;
allowing selection of variables and ranges for the variables based on visual displays of the effects on range choices, the allowing occurring via a user interface of the data analysis application;
generating analysis content directly from within the application user interface without requiring input of underlying data analysis algorithms;
providing an integrated social network via which a user of the data analysis application shares the generated analysis content with another user; and
offering, via the social network, a subscription to the generated analysis content, wherein the generated analysis content offered by the subscription via the social network comprises a classifier protocol via which a subscribing user can receive predictions based on a predictive model, and wherein the integrated social network comprises subscription features for at least one of: following the generated analysis content, tagging the generated analysis content with a like tag, and tagging the generated analysis content with a dislike tag.

14. The system as in claim 13, wherein the computer hardware comprises a programmable processor and a machine-readable medium storing instructions that, when executed by the programmable processor, cause the programmable processor to perform at least some of the operations.

15. The system as in claim 13, wherein the generated analysis content further comprises one or more predictive criteria, a background data set, and a focus set defined by a user of the data analysis application for the classifier protocol.

* * * * *